United States Patent
Joshi et al.

(10) Patent No.: US 11,288,843 B2
(45) Date of Patent: Mar. 29, 2022

(54) LOSSY COMPRESSION OF POINT CLOUD OCCUPANCY MAPS

(71) Applicant: Samsung Electronics Co., Ltd., Suwon-si (KR)

(72) Inventors: Rajan Laxman Joshi, San Diego, CA (US); Neha Dawar, Plano, TX (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 16/730,532

(22) Filed: Dec. 30, 2019

(65) Prior Publication Data

US 2020/0219288 A1 Jul. 9, 2020

Related U.S. Application Data

(60) Provisional application No. 62/869,652, filed on Jul. 2, 2019, provisional application No. 62/841,326, filed on May 1, 2019, provisional application No. 62/836,790, filed on Apr. 22, 2019, provisional application No. 62/816,471, filed on Mar. 11, 2019, provisional application No. 62/790,177, filed on Jan. 9, 2019, provisional application No. 62/789,663, filed (Continued)

(51) Int. Cl.
  *G06T 9/00* (2006.01)
  *G06T 5/20* (2006.01)
  *H04N 19/184* (2014.01)

(52) U.S. Cl.
  CPC ............... *G06T 9/001* (2013.01); *G06T 5/20* (2013.01); *H04N 19/184* (2014.11)

(58) Field of Classification Search
  CPC .......... G06T 9/001; G06T 5/20; H04N 19/184
  USPC ......................................................... 382/232
  See application file for complete search history.

(56) References Cited

U.S. PATENT DOCUMENTS

| 2016/0086353 A1 | 3/2016 | Lukac et al. |
| 2017/0347100 A1 | 11/2017 | Chou et al. |
| 2018/0053324 A1 | 2/2018 | Cohen et al. |

(Continued)

FOREIGN PATENT DOCUMENTS

KR  10-2018-0071928 A  6/2018

OTHER PUBLICATIONS

International Search Report dated Apr. 24, 2020 in connection with International Patent Application No. PCT/KR2020/000142, 3 pages.

(Continued)

*Primary Examiner* — Michael R Neff

(57) ABSTRACT

A decoding device, an encoding device and methods for point cloud encoding and decoding are disclosed. The method for decoding includes decoding an attribute frame, a geometry frame, and occupancy map frame from a received bitstream. The attribute and geometry frames include pixels representing points of a 3D point cloud and the occupancy map frame includes values. The method also includes generating a binary occupancy map frame based on comparing the values in the occupancy map frame to a scaling threshold to determine whether the pixels included in the attribute and geometry frames at corresponding positions in the binary occupancy map frame are valid pixels. The method further includes generating the 3D point cloud using the attribute frame, the geometry frame, and the binary occupancy map frame.

20 Claims, 12 Drawing Sheets

Related U.S. Application Data on Jan. 8, 2019, provisional application No. 62/788,196, filed on Jan. 4, 2019.

(56) References Cited

U.S. PATENT DOCUMENTS

| | | |
|---|---|---|
| 2018/0173239 A1 | 6/2018 | Yoon et al. |
| 2018/0268570 A1 | 9/2018 | Budagavi et al. |
| 2020/0364904 A1* | 11/2020 | Najaf-Zadeh ............. G06T 9/00 |

OTHER PUBLICATIONS

Written Opinion of the International Searching Authority dated Apr. 24, 2020 in connection with International Patent Application No. PCT/KR2020/000142, 4 pages.

Joshi et al., "[V-PCC] [New Proposal] On occupancy map compression", ISO/IEC JTC1/SC29/WG11 MPEG2019/m46049, Jan. 2019, 5 pages.

Joshi et al., "[V-PCC] Report on Core Experiment CE 2.9 on lossy occupancy map coding", ISO/IEC JTC1/SC29/WG11 MPEG2019/m47537-v2, Mar. 2019, 5 pages.

International Organization for Standardization, "Text of ISO/IEC DIS 23090-5 Video-based Point Cloud Compression", ISO/IEC JTC 1/SC 29/WG 11, N18670, Oct. 2019, 185 pages.

Extended European Search Report dated Dec. 17, 2021 regarding Application No. 20736020.7, 6 pages.

Valentin et al., "Video-based Occupancy Map Compression in TMC2", ISO/IEC JTC1/SC29/WG11 MPEG2018/m42639, Apr. 2018, 5 pages.

Guede et al., "PCC new proposal: Improve point cloud compression through occupancy map refinement", ISO/IEC JTC1/SC29/WG11 MPEG2018/m44779, Oct. 2018, 7 pages.

Park et al., "Improvement of Internal Cell Skip Method for Occupancy Map Coding in TMC2", ISO/IEC JTC1/SC29/WG11 MPEG2018/M43285, Jul. 2018, 8 pages.

* cited by examiner

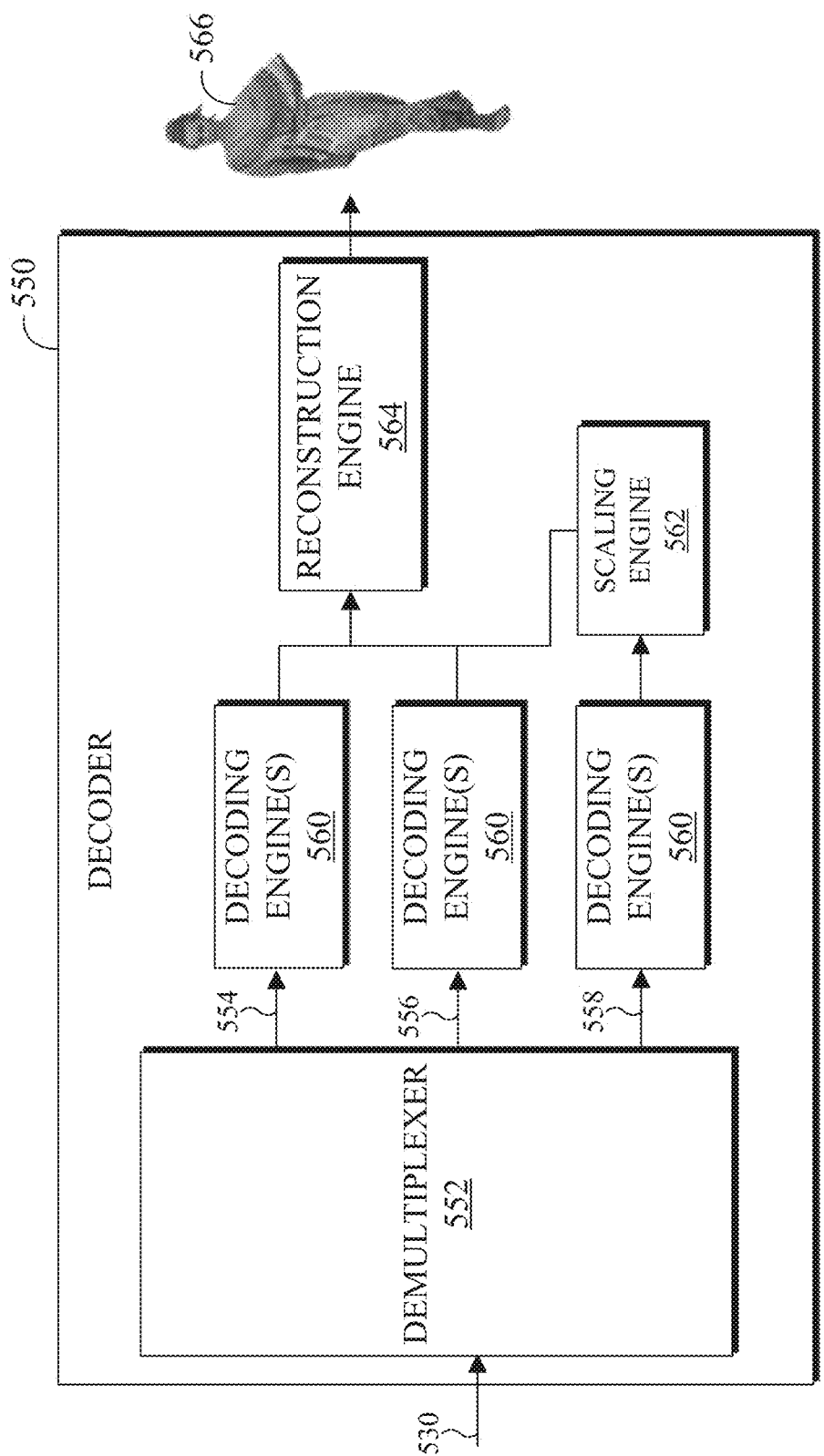

| 1 | 3 | 5 | 3 | 1 |
|---|---|---|---|---|
| 3 | 11 | 20 | 11 | 3 |
| 5 | 20 | 84 | 20 | 5 |
| 3 | 11 | 20 | 11 | 3 |
| 1 | 3 | 5 | 3 | 1 |

| 1 | 4 | 6 | 4 | 1 |
|---|---|---|---|---|
| 4 | 16 | 24 | 16 | 4 |
| 6 | 24 | 36 | 24 | 6 |
| 4 | 16 | 24 | 16 | 4 |
| 1 | 4 | 6 | 4 | 1 |

| 12 | 28 | 12 |
|---|---|---|
| 28 | 96 | 28 |
| 12 | 28 | 12 |

LOSSY COMPRESSION OF POINT CLOUD OCCUPANCY MAPS

CROSS-REFERENCE TO RELATED APPLICATIONS AND CLAIM OF PRIORITY

This application claims priority under 35 U.S.C. § 119(e) to U.S. Provisional Patent Application No. 62/788,196, filed Jan. 4, 2019; U.S. Provisional Patent Application No. 62/789,663, filed Jan. 8, 2019; U.S. Provisional Patent Application No. 62/790,177, filed Jan. 9, 2019; U.S. Provisional Patent Application No. 62/816,471, filed Mar. 11, 2019; U.S. Provisional Patent Application No. 62/836,790, filed Apr. 22, 2019; U.S. Provisional Patent Application No. 62/841,326, filed May 1, 2019; and U.S. Provisional Patent Application No. 62/869,652, filed Jul. 2, 2019. The above-identified provisional patent applications are hereby incorporated by reference in its entirety.

TECHNICAL FIELD

This disclosure relates generally to multimedia data. More specifically, this disclosure relates to an apparatus and a method for compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds are can be used in the immersive environment.

Point clouds are a set of points in 3D space that represent an object. Point clouds are common in a variety of applications such as gaming, 3D maps, visualizations, medical applications, augmented reality, virtual reality, autonomous driving, multi-view replay, 6 degrees of freedom (DoF) immersive media, to name a few. Point clouds, if uncompressed, generally require a large amount of bandwidth for transmission. Due to the large bitrate requirement, point clouds are often compressed prior to transmission. To compress a 3D object such as a point cloud, often requires specialized hardware. To avoid specialized hardware to compress a 3D point cloud, a 3D point cloud can be manipulated onto traditional two-dimensional (2D) frames and that can compressed and later be reconstructed and viewable to a user.

SUMMARY

This disclosure provides lossy compression of point cloud occupancy maps.

In one embodiment, a decoding device for point cloud decoding is provided. The decoding device includes a communication interface and a processor. The communication interface is configured to receive a compressed bitstream. The processor is configured to decode an attribute frame, a geometry frame, and occupancy map frame from the bitstream. The attribute and geometry frames include pixels representing points of a 3D point cloud and the occupancy map frame includes pixels representing values. The processor is also configured to generate a binary occupancy map frame based on comparing the values in the occupancy map frame to a scaling threshold. The binary occupancy map frame determines whether the pixels included in the attribute and geometry frames at corresponding positions in the binary occupancy map frame are valid pixels. The processor is further configured to generate the 3D point cloud using the attribute frame, the geometry frame, and the binary occupancy map frame.

In another embodiment, an encoding device for point cloud encoding is provided. The encoding device includes a processor and a communication interface. The processor is configured to generate, for a 3D point cloud, an attribute frame that includes pixels and a geometry frame that includes pixels. A portion of the pixels included in the attribute and geometry frames represent points of the 3D point cloud. The processor is also configured to generate an occupancy map frame. The occupancy map frame indicates whether the pixels included in the attribute and geometry frames, at respective positions in the occupancy map frame, represent the points of the 3D point cloud. The processor is further configured to modify the occupancy map frame by a scale factor and identify a scaling threshold based on the scale factor. Additionally, the processor is configured to encode the attribute frame, the geometry frame, the modified occupancy map frame, and the scaling threshold to generate a bitstream. The communication interface processor is configured to transmit the bitstream.

In yet another embodiment a method for point cloud decoding is provided. The method includes receiving a bitstream. The method also includes decoding an attribute frame, a geometry frame, and occupancy map frame from the received bitstream. The attribute and geometry frames include pixels representing points of a 3D point cloud and the occupancy map frame includes values. The method also includes generating a binary occupancy map frame based on comparing the values in the occupancy map frame to a scaling threshold. The binary occupancy map frame determines whether the pixels included in the attribute and geometry frames at corresponding positions in the binary occupancy map frame are valid pixels. The method further includes generating the 3D point cloud using the attribute frame, the geometry frame, and the binary occupancy map frame Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5C illustrates an example block diagram of a decoder in accordance with an embodiment of this disclosure;

FIGS. 6B, 6C, and 6D illustrate example pre-filters in accordance with an embodiment of this disclosure;

DETAILED DESCRIPTION

Figure 1:
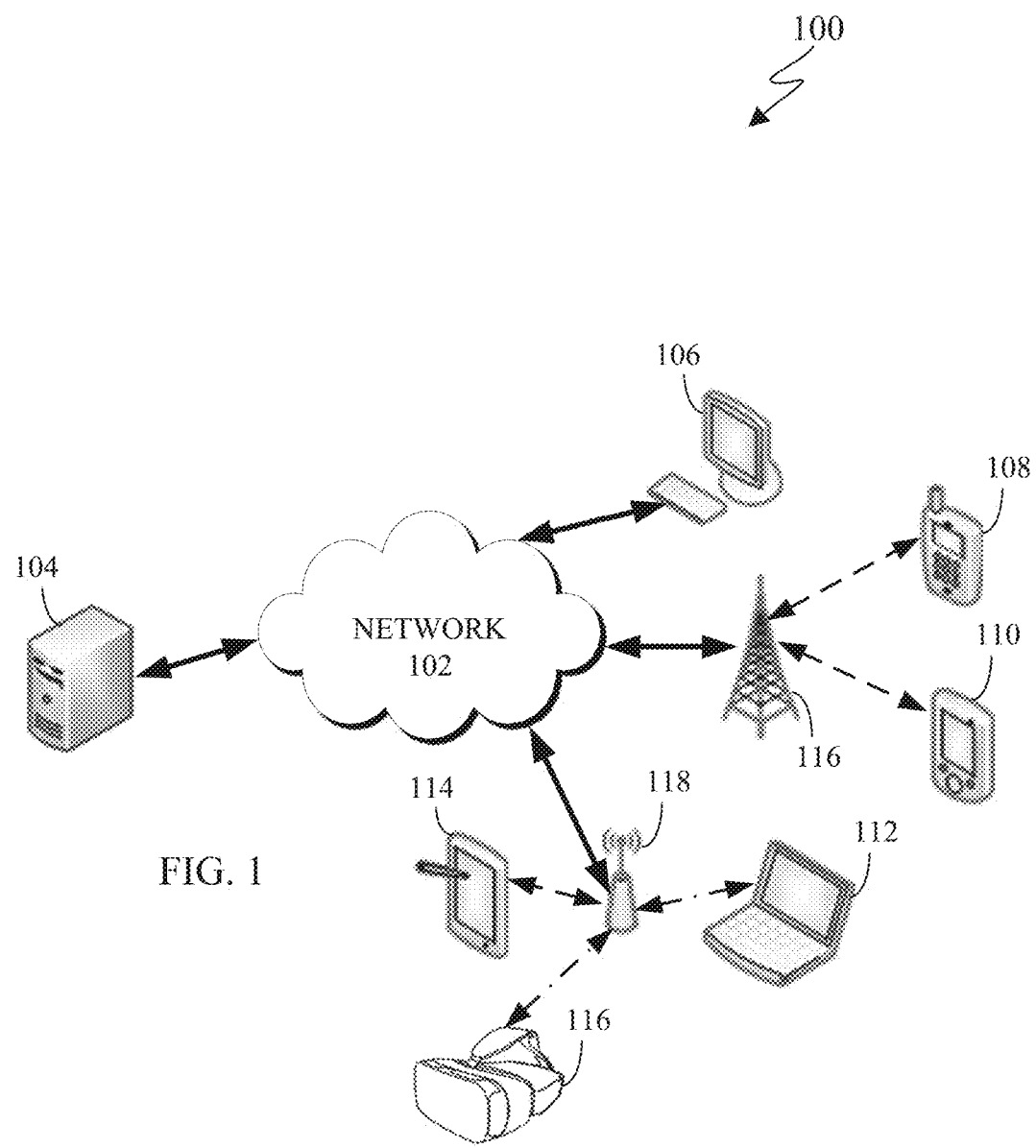
FIG. 1 illustrates an example communication system in accordance with an embodiment of this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Augmented reality (AR) is an interactive experience of a real world environment where objects that reside in the real-world environment are augmented with virtual objects, virtual information, or both. Virtual reality (VR) is a rendered version of a visual scene, where the entire scene is computer generated. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). A HMD represent one of many types of devices that provide AR and VR experiences to a user. A HMD is a device that enables a user to view the VR scene and adjust the displayed content based on movements of the head of the user. Typically, a HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point is positioned in a particular geometric position within 3D space and includes one or more attributes such as color (also referred to as texture). A point cloud can be similar to a virtual object in a VR or AR environment. A point mesh is another type of a virtual representation of an object in a VR or AR environment. A point cloud or a point mesh can be an object, multiple objects, a virtual scene (which includes multiple objects), and the like. Point clouds and point meshes are commonly used in a variety of applications, including gaming, 3D mapping, visualization, medicine, AR, VR, autonomous driving, multi-view replay, 6 DoF immersive media, to name a few. As used herein, the terms point clouds and point meshes can be used interchangeably.

Point clouds represent volumetric visual data. Point clouds consist of multiple 3D points positioned in 3D space, where each point in a 3D point cloud includes a geometric position represented by 3-tuple (X, Y, Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In some embodiments, the points are positioned on the external surface of the object. In other embodiments, the points are positioned throughout both the internal structure and external surface of the object.

In addition to the geometric position of a point (the location of the point in 3D space), each point in the point cloud can also include attributes such as color (also referred to as texture), reflectance, intensity, surface normal, and the like. In some embodiments, a single point of a 3D point cloud can have multiple attributes. In some applications, point clouds can also be used to approximate light field data in which, each point includes multiple view-dependent, color information (R, G, B or Y, U, V triplets).

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, an attribute corresponding to the color of a point cloud can consume twenty-four bits. For instance, if a color component of a single point is defined based on a Red value, Green value, and Blue value, then each color component (Red, Green, and Blue) uses eight bits, totaling the twenty-four bits. As a result, a single point with a ten-bit geometric attribute data, per coordinate, and an eight-bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point clouds is necessary to expedite and improve transmission of the point cloud from one device (such as a source device) to another device (such as a display device) due to the bandwidth necessary to transmit the point cloud. Certain dedicated hardware components can be used to meet the real-time demands or reduce delays or lags in the transmitting and rendering a 3D point cloud; however such hardware components are often expensive. Additionally, many video codecs are not able to encode and decode 3D video content, such as a point cloud. Compressing and decompressing a point cloud by leveraging existing 2D video codecs enables the encoding and decoding of a point cloud to be widely available without the need for new or specialized hardware. According to embodiments of the present disclosure, leveraging existing video codecs can be used to compress and reconstruct a point cloud, when the point cloud is converted from a 3D representation to a 2D representation. In certain embodiments, the conversion of a point cloud from a 3D representation to a 2D representation includes projecting clusters of points of the 3D point cloud onto 2D frames by creating patches. Thereafter, video codecs such as HEVC, AVC, VP9, VP8, VVC, and the like can be used to compress the 2D frames representing the 3D point cloud similar to a 2D video.

Figure 4A:
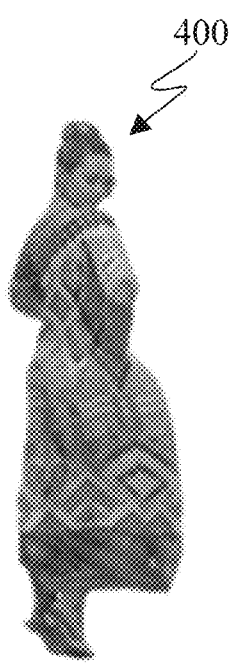
FIGS. 4A, 4B, and 4C illustrate an example 3D point cloud and 2D frames, that represent the 3D point cloud in accordance with an embodiment of this disclosure.
Figure 4B:
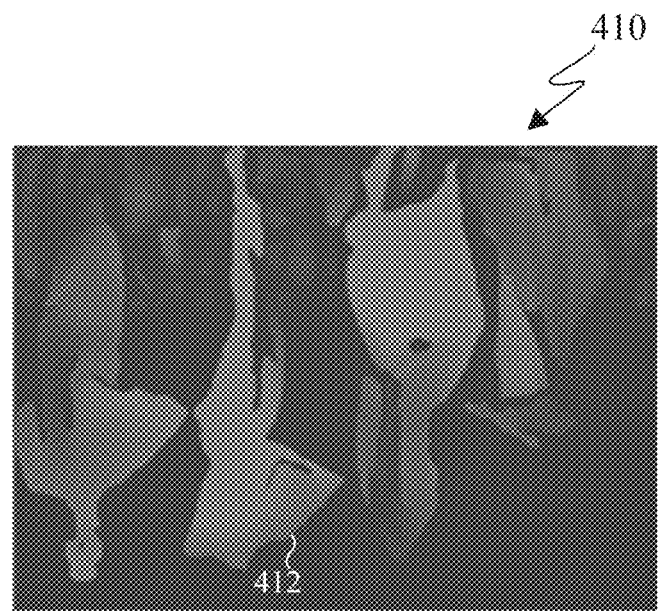
Figure 4C:
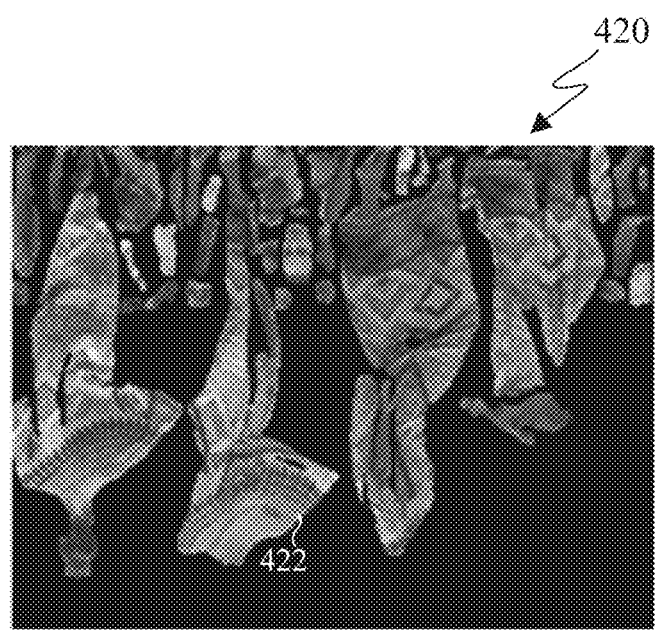

To transmit a point cloud from one device to another, the 3D point cloud is represented as patches on 2D frames. The 2D frames can include projections at different layers of the 3D point cloud. The frames can also represent different attributes of the point cloud, such as one frame includes values representing geometry positions of the points and another frame includes values representing color information associated with each of the points. A decoder reconstructs the patches within the 2D frames into the 3D point cloud, such that the point cloud can be rendered, displayed, and then viewed by a user. When the point cloud is deconstructed to fit on multiple 2D frames and compressed, the frames can be transmitted using less bandwidth than used to transmit the original point cloud. FIGS. 4A-4C, which are described in greater detail below, illustrate a 3D point cloud that is projected onto 2D frames by creating patches of the point cloud and two attributes.

Embodiments of the present disclosure provide systems and methods for converting a point cloud into a 2D representation that can be transmitted and then reconstructed into the point cloud for rendering. In certain embodiments, a point cloud is deconstructed into multiple patches, and multiple frames are generated that include the patches. In certain embodiments, a frame includes patches of the same attributes. The points of the 3D point cloud that are represented in one patch in one frame correspond to the same points that are represented in another patch in a second frame when the two patches are positioned at over the same coordinates. For example, a pixel at the position (u, v) in a frame that represents geometry is the geometry position of a pixel at the same (u, v) position in a frame that represents an attribute such as color. In other embodiments, the patches in one frame represent multiple attributes associated with the points of the point cloud, such as a geometric position of the points in 3D space and color.

An encoder projects the 3D point cloud onto the multiple 2D frames and generates a bitstream. The encoder or another device then transmits the bitstream to a different device. The frames can be compressed by leveraging various video compression codecs, image compression codecs, or both. A decoder receives the bitstream, decompresses the bitstream into the frames, and reconstructs the point cloud based on the information within the frames. After the point cloud is reconstructed, the 3D point cloud can be rendered and displayed for a user to observe. In certain embodiments, frames representing different attributes (including the geometric positions of the points) are encoded and decoded separately. In other embodiments, frames representing different attributes (including the geometric positions of the points) are encoded and decoded together.

During projection the encoder decomposes the point cloud into a set of patches by clustering the points. The geometry and attribute information of these patches are packed into geometry video frames and attribute video frames, respectively. The geometry video frames are used to encode the geometry information, and each corresponding attribute e video frame is used to encode an attribute (such as texture) of the point cloud. Each pixel within a patch in the geometry video frame corresponds to a point in 3D space. The two transverse coordinates (with respect to the projection plane) of a 3D point correspond to the column and row indices in the geometry video frame (u, v) plus a transverse-offset which determines the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

As discussed in great detail below, when a frame is generated an occupancy map is also generated. Generally, the occupancy map indicates, for each pixel within a frame, whether the pixel is a valid pixel or an invalid pixel. For example, if a pixel in occupancy map at coordinate (u, v) is valid, then the corresponding pixel in a geometry frame and the corresponding attribute frame at the coordinate (u, v) are also valid. If the occupancy map at coordinate (u, v) indicates an invalid pixel, then the decoder skips the corresponding pixels in the geometry and attribute frames at the coordinate (u, v). In certain embodiments, the occupancy map at a position (u, v) can be one or zero. Generally the occupancy map is binary, such that the value of each pixel is either one or zero. When the value of a pixel at position (u, v) of the occupancy map is one, it indicates that a pixel at position (u, v) of an attribute frame and the geometry frame is valid. In contrast, when the value of a pixel at position (u, v) of the occupancy map is zero, it indicates that a pixel at position (u, v) of the attribute frame and the geometry frame is invalid.

Embodiments of the present disclosure provide systems and methods for improving the compression and decompression of a point cloud. Generally the occupancy map is encoded in a lossless manner to maintain the values within the occupancy map. The occupancy map is generally not compressed in a lossy manner, since a small quantization error that is introduced during the encoding or decoding of the occupancy map could change a value of any of the pixels in the occupancy map. Since the values in the occupancy map are generally binary in nature, (such as zero or one), a slight change in value of any of the pixels in the occupancy map would remove the binary nature of the occupancy map (since a value of a pixel could be changed to a value that is not zero or one). As such, a decoder would be unable to reconstruct the point cloud using a non-binary occupancy map.

Additionally, even if the occupancy map remains binary a slight change in value of any of the pixels in the occupancy map could turn a valid pixel into an invalid pixel (or vis-versa). If pixel values in the occupancy map change from a valid pixels to an invalid pixels (or vis-versa) visual artifacts can be created. The visual artifacts are generated in the reconstructed point cloud when pixels that were previously not included in the point cloud are constructed and identified as valid pixels, as well as pixels when previously valid pixels in the point cloud are now identified as invalid and not reconstructed.

According to embodiments of the present disclosure, architecture and methods for performing point cloud compression and decompression using a video codec is provided. In particular, embodiments of the present disclosure provide devices and methods for lossy encoding of the occupancy map. When a 3D point cloud is converted from a 3D representation to a 2D representation, the points of 3D point cloud are clustered into groups and projected onto frames. Each frame can include pixels that that correspond to the point cloud while other pixels in the frame are do not correspond to points of the point cloud. An occupancy map frame identifies which pixels in the frames correspond to points of the point cloud. In order to encode the occupancy map in a lossy manner embodiments of the present disclosure provide systems and methods for modifying the binary occupancy map in the encoder, such that when the modified occupancy map is decoded by the decoder, the decoder is able to return the non-binary occupancy map to a binary state in order to reconstruct the 3D point cloud.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 receives a 3D point cloud, decomposes the 3D point cloud to fit on 2D frames, compresses the frames to generate a bitstream. The bitstream can be transmitted to a storage device, such as an information repository, or one or more of the client devices 106-116. For another example, one of the client devices 106-116 can receive a 3D point cloud, decompose the 3D point cloud to fit on 2D frames, compress the frames to generate a bitstream that can be transmitted to a storage device, such as an information repository, another one of the client devices 106-116, or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
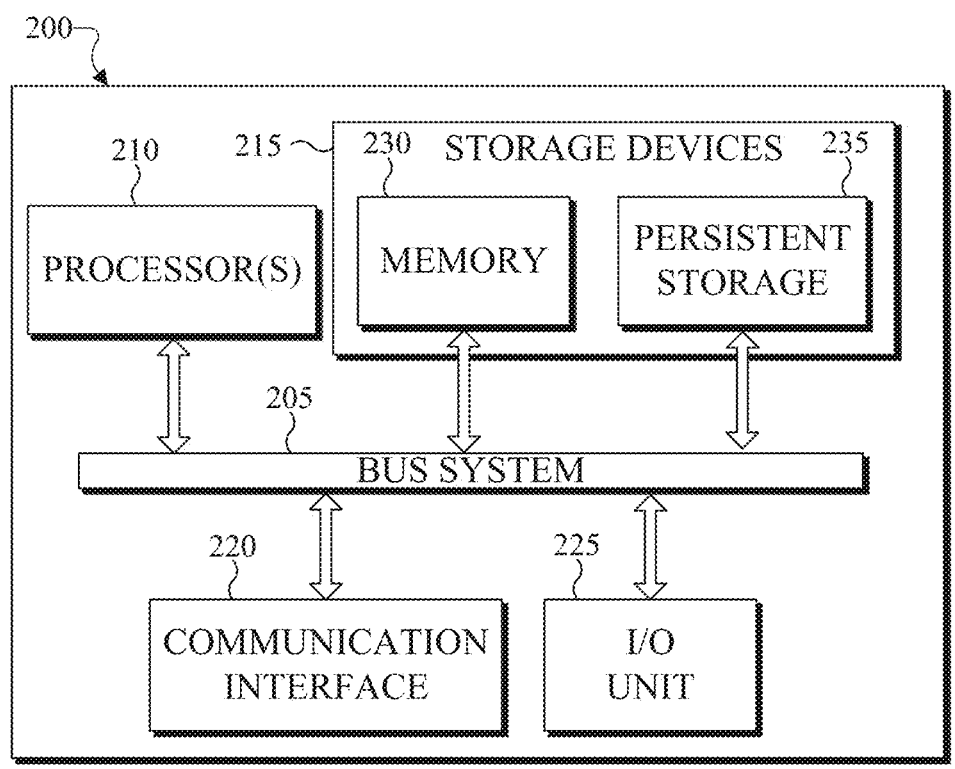
FIGS. 2 and 3 illustrate example electronic devices in accordance with an embodiment of this disclosure.
Figure 3:
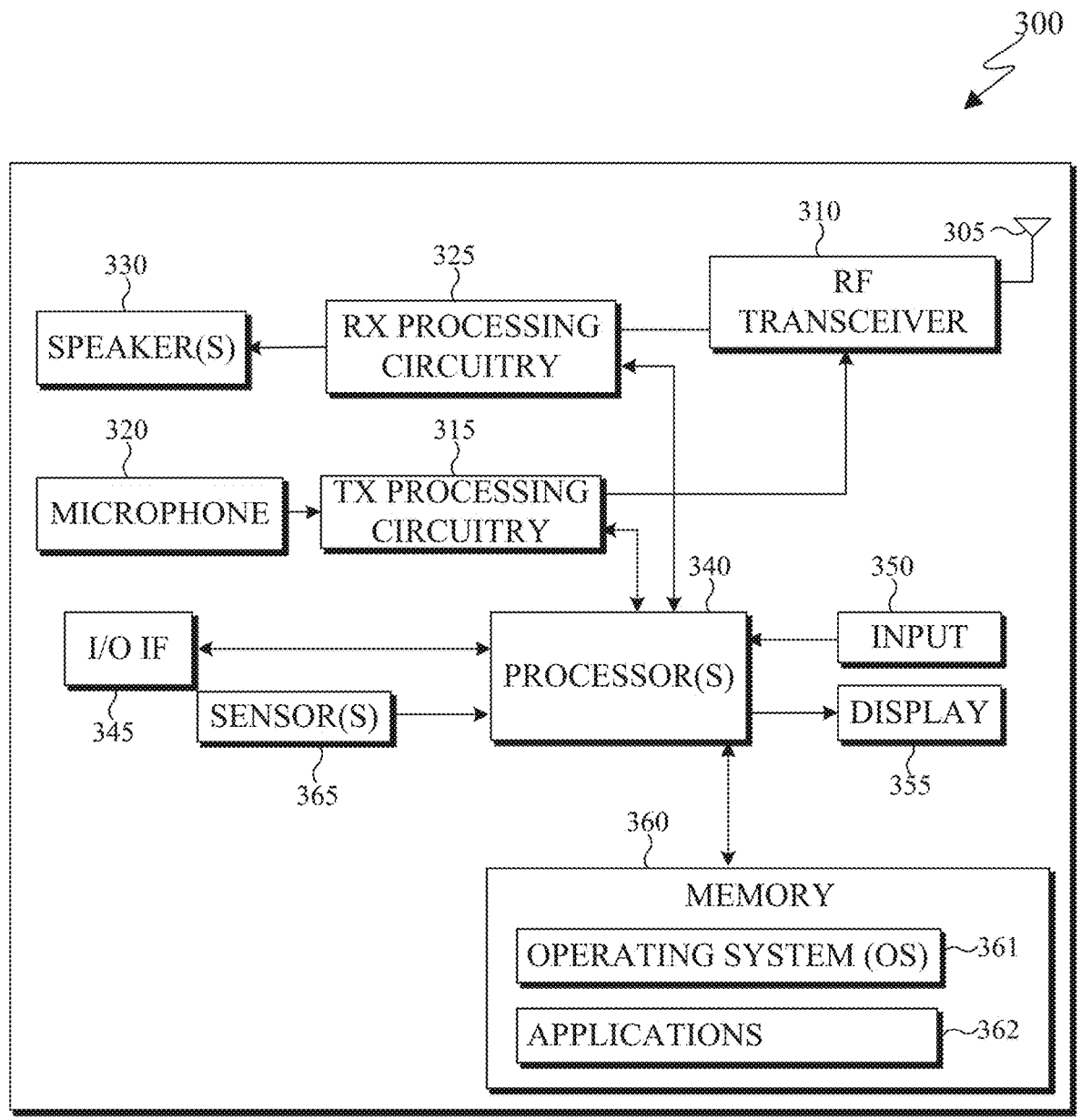

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, when the 3D point cloud is encoded by an encoder, the encoder also decodes the encoded 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 downconverts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a 3D point cloud or capture (or record) content through a camera. The electronic device 300 can encode the media content to generate a bitstream (similar to the server 200, described above), such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a point cloud, the electronic device 300 projects the point cloud into multiple patches. For example, a cluster of points of the point cloud can be grouped together to generate a patch. A patch can represent a single attribute of the point cloud, such as geometry, color, and the like. Patches that represent the same attribute can be packed into the same 2D frame. The 2D frames are then encoded to generate a bitstream. During the encoding process additional content such as metadata, flags, occupancy maps, and the like can be included in the bitstream.

Similarly, when decoding media content included in a bitstream that represents a 3D point cloud, the electronic device 300 decodes the received bitstream into frames. In certain embodiments, the decoded bitstream also includes an occupancy map, 2D frames, auxiliary information, and the like. A geometry frame can include pixels that indicate geographic coordinates of points of the point cloud in 3D space. Similarly, an attribute frame can include pixels that indicate the RGB (or YUV) color (or any other attribute) of each geometric point in 3D space. The auxiliary information can include one or more flags, or quantization parameter size, one or more thresholds, or any combination thereof. After reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

FIGS. 4A, 4B, and 4C illustrate an example 3D point cloud 400 and 2D frames 410 and 420 that represent the 3D point cloud 400 in accordance with an embodiment of this disclosure. In particular, FIG. 4A illustrates the 3D point cloud 400, and FIGS. 4B and 4C each illustrate a 2D frames that includes patches. For example, the FIG. 4B illustrates a 2D frame 410 that represents the geometric position of points of the 3D point cloud 400. The FIG. 4C illustrates the frame 420 that represents the color (or another attribute) associated with points of the 3D point cloud 400. The embodiment of FIGS. 4A, 4B, and 4C, are for illustration only and other embodiments could be used without departing from the scope of this disclosure.

The 3D point cloud 400 is a set of data points in 3D space. Each point of the 3D point cloud 400 a geometric position that provides the structure of the 3D point cloud and one or more attributes that provide information about each point such as color, reflectiveness, material, and the like.

FIGS. 4B and 4C illustrate the 2D frames 410 and 420 respectively. The frame 410 includes multiple patches (such as a patch 412) representing the depth values of the 3D point cloud 400. The frame 420 includes multiple patches (such as a patch 422) representing the color of the 3D point cloud 400. Each pixel of color in the frame 420 corresponds to a particular geometry pixel in the frame 410. For example, a mapping is generated between each pixel in the frame 410 and the frame 420. As shown in the frames 410 and 420, some of the pixels correspond to valid pixels that represent the 3D point cloud 400 while other pixels (the black area in the background) correspond to invalid pixels that do not represent the 3D point cloud 400.

The location of the patches within the 2D frames 410 and 420 can be similar for a single position of the 3D point cloud. For example, as the 3D point cloud 400 changes, new frames can be generated with different patches based on the new position the 3D point cloud.

Although FIGS. 4A, 4B, and 4C illustrate example point cloud and 2D frames representing a point cloud various changes can be made to FIGS. 4A, 4B, and 4C. For example, the point cloud and point mesh represent a single object, whereas in other embodiments, a point cloud or point mesh can represent multiple objects, scenery (such as a landscape), a virtual object in AR, and the like. In another example, the patches included in the 2D frames can represent other attribute, such as texture, luminance, material, and the like. FIGS. 4A, 4B, and 4C do not limit this disclosure to any particular 3D object(s) and 2D frames representing the 3D object(s).

Figure 5A:
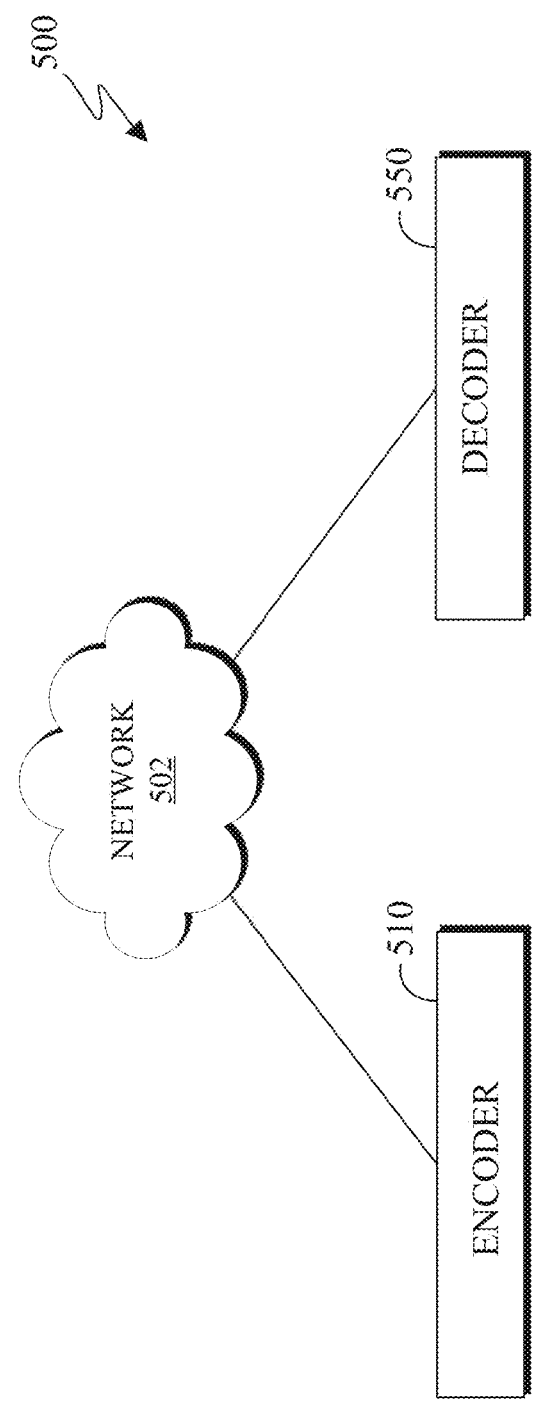
FIG. 5A illustrates a block diagram of an example environment-architecture in accordance with an embodiment of this disclosure.
Figure 5B:
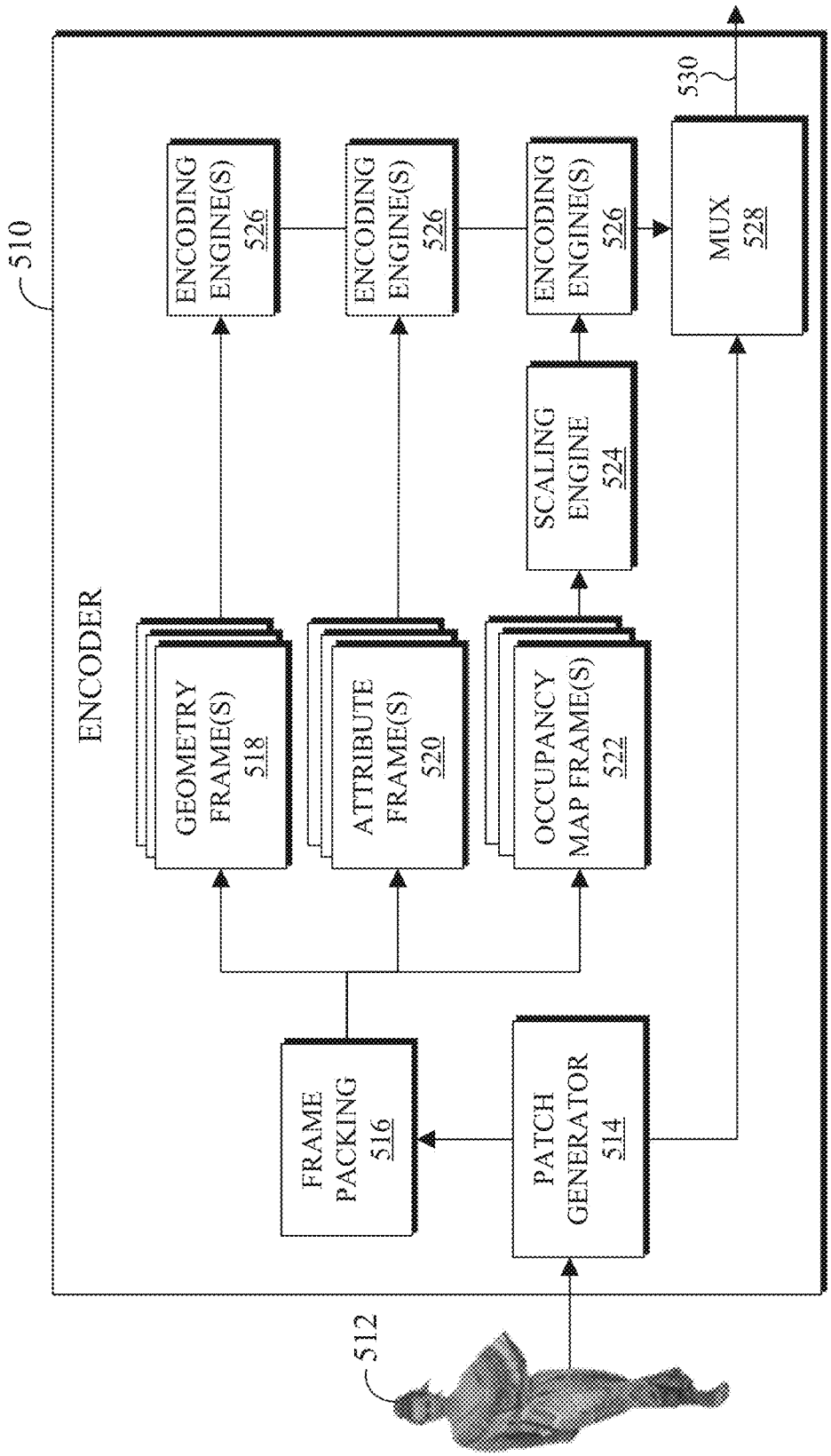
FIG. 5B illustrates an example block diagram of an encoder in accordance with an embodiment of this disclosure.

FIGS. 5A, 5B, and 5C illustrate block diagrams in accordance with an embodiment of this disclosure. In particular, FIG. 5A illustrates a block diagram of an example environment-architecture 500 in accordance with an embodiment of this disclosure. FIG. 5B illustrates an example block diagram of the encoder 510 of FIG. 5A and FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

As shown in FIG. 5A, the example environment-architecture 500 includes an encoder 510 and a decoder 550 in communication over a network 502. The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, the server 200 of FIG. 2, the electronic device 300 of FIG. 3, or another suitable device. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

The encoder 510 is described with more below in FIG. 5B. Generally, the encoder 510 receive 3D media content, such as a point cloud, from another device such as a server (similar to the server 104 of FIG. 1, the server 200 of FIG. 2) or an information repository (such as a database), or one of the client devices 106-116. In certain embodiments, the encoder 510 can receive media content from multiple cameras and stitch the content together to generate a 3D scene that includes one or more point clouds.

In certain embodiments, the encoder 510 projects a point cloud into two dimensions which create patches that represent the projection. The encoder 510 clusters points of a point cloud into groups which are projected onto different planes such as an XY plane, an YZ plane, and an XZ plane. Each cluster of points is represented by a patch when projected onto a plane. The encoder 510 can project a point cloud into two dimensions. It is noted, that a point of the 3D point cloud is located in 3D space based on a (X, Y, Z) coordinate value. When the point is projected onto a 2D frame the pixel, representing the projected point, is denoted by the column and row index in the frame indicated by the coordinate (u, v). Additionally, 'u' and 'v' can range from zero to the number of rows or columns in the depth image, respectively.

The encoder 510 packs the patches representing the point cloud onto 2D video frames. One set of frames can represent geometry and another set of frames can represent one or more attributes. In certain embodiments, there are no attribute frames. It should be noted that additional frames can be generated based on more layers as well as each additionally defined attribute.

The encoder 510 also generates an occupancy map based on the geometry frame and the attribute frame(s) to indicate which pixels within the frames are valid. As described in greater detail below, the encoder 510 modifies the occupancy map in order to encode the occupancy map in a lossly manner.

The encoder 510 transmits frames representing the point cloud as an encoded bitstream. The bitstream can be transmitted to an information repository (such as a database) or an electronic device that includes a decoder (such as the decoder 550), or the decoder 550 itself through the network 502. The encoder 510 is described in greater detail below in FIG. 5B.

The decoder 550, which is described with more below in FIG. 5C, receives a bitstream that represents media content, such as a point cloud. The bitstreams can include data representing a 3D point cloud. In certain embodiments, the decoder 550 can decode the bitstream and generate multiple frames such as a geometry frame, attribute frames, and a non-binary occupancy map. The decoder 550 returns the non-binary occupancy map into a binary occupancy map, which is used to reconstruct the point cloud from the multiple frames (such as a geometry frame and one or more attribute frames).

FIG. 5B illustrates the encoder 510 that receives a 3D point cloud 512 and generates a bitstream 530. The bitstream 530 includes data representing a 3D point cloud 512. The bitstream 530 can include multiple bitstreams and can be transmitted via the network 502 of FIG. 5A to another device, such as the decoder 550 or an information repository. The encoder 510 includes a patch generator 514, a frame packing 516, various frames (such as one or more geometry frames 518, one or more texture attribute frames 520, and one or more occupancy map frames 522), a scaling engine 524, one or more encoding engines 526, and a multiplexer 528. In certain embodiments, the encoder 510 does not generate any attribute frames (such as the one or more attribute frames 520).

The 3D point cloud 512 can be stored in memory (not shown) or received from another electronic device (not shown). The 3D point cloud 512 can be a single 3D object, or a grouping of 3D objects. The 3D point cloud 512 can be stationary object or an object which moves. In certain embodiments, the 3D point cloud 512 includes only geometry information (indicating the geometric position of each point), while in other embodiments, the 3D point cloud 512 includes the geometry information and one or more attributes (indicating various features of the points such as color, reflectance, material, and the like)

The patch generator 514 generates patches by taking projections of the 3D point cloud 512. When attribute information is present in the 3D point cloud 512, the patch generator 514 splits the geometry information and attribute information of each point of the 3D point cloud 512. The patch generator 514 can use two or more projection planes, to cluster the points of the 3D point cloud 512 to generate the patches. The geometry and each attribute are eventually packed into respective geometry frames 518 or the attribute frames 520, by the frame packing 516.

For each input point cloud, such as the 3D point cloud 512, the geometry and one or more attributes (such as color) are clustered using one or more criteria. The criteria include a normal direction, a distance to projected frames, contiguity, and the like. After the points are clustered, the geometry of each point and a corresponding attribute(s) of each point are projected onto planes, such as the XY plane, the YZ plane, or the XZ plane.

When projected, each cluster of points of the 3D point cloud 512 appears as patch. Each patch (also referred to as a regular patch) represents a particular aspect (geometry or attribute) of the point cloud. For example, a single cluster of points can be represented as multiple patches on multiple frames, where each patch represents a different attribute. It is noted that patches representing different attributes of the same cluster of points include a correspondence or a mapping, such that a pixel in one patch corresponds to the same pixel in another patch.

The frame packing 516 sorts and packs the patches (both the geometry and attribute patches) into respective frames, such that the geometry patches are packed into the geometry frames 518 and each of the different attribute patches are packed into respective the attribute frames 520. As illustrated in FIGS. 4B and 4C, the frame packing 516 organizes the geometry information and attribute information and places the patches representing the geometry information and each respective attribute information within respective frames. The frame packing 516 also generates one or more occupancy map frames 522 based on the placement of the patches within the geometry frames 518 and the attribute frames 520.

The geometry frames 518 include pixels representing the geometry values of the 3D point cloud 512. The attribute frames 520 can represent the color attribute of each and includes the color values of the points of the 3D point cloud 512. If the geometry frame 518 indicates where each point of the 3D point cloud 512 is in 3D space, then the corresponding attribute frame 520 indicates the color of each corresponding point. Additional frames can be created that represent other attributes. For example, if another set of attribute frames are generated, such as reflectance frames (not shown) then the corresponding reflectance frame indicates the level of reflectance of each corresponding point represented by the geometry frame 518. In certain embodiments, each geometry frame 518 has at least one corresponding attribute frame 520.

The occupancy map frames 522 represent occupancy maps that indicate the valid pixels in the frames (such as the geometry frames 518 and the attribute frames 520). For example, the occupancy map frames 522 indicate whether each pixel in the geometry and attribute frames 518 and 520 is a valid pixel or an invalid pixel. The valid pixels correspond to pixels that represent points of the 3D point cloud 512. The invalid pixels are pixels within a frame that do not represent to a point of the 3D point cloud 512. In certain embodiments, one of the occupancy map frames 522 can correspond to both a geometry frame 518 and a attribute frame 520.

For example, when the frame packing 516 generates the occupancy map frames 522, the occupancy map frames include predefined values for each pixel, such as zero or one. When a pixel of the occupancy map at position (u, v) is a value of zero, indicates that the pixel at (u, v) in the geometry frame 518 and the attribute frame 520 are invalid. When a pixel of the occupancy map at position (u, v) is a value of one, indicates that the pixel at (u, v) in the geometry frame 518 and the attribute frame 520 are valid.

An occupancy precision value can be applied to the occupancy map frame 522 in order to reduce the number of bits needed to code the occupancy map frame. The occupancy precision establishes a value M, where M is an integer such as one, two, four, and the like. The value M corresponds to an M×M block that shifts over the entire occupancy map frame 522. The M×M block generates a single value for the pixels that are within the block in order to reduce the amount of information included in the occupancy map frame 522. For example, an occupancy precision of four generally uses $\frac{1}{4}^{th}$ of as many bits to code an occupancy map as compared to an occupancy precision of one. When an occupancy precision of four is applied to an occupancy map frame 522 that is 16×16 in size (which would include 256 pixels, each with its own value), only 16 values would be encoded and represent the entirety of the occupancy map instead of 256 values.

Only one value is used for the pixels within the M×M block. If the M×M block includes only valid pixels, a single valid pixel is generated to represent all of the pixels within the M×M block. Similarly, if the M×M block includes only invalid pixels, a single invalid pixel is generated to represent all of the pixels within the M×M block. However, if the M×M block includes both valid and invalid pixels, a single valid pixel is generated to represent all of the pixels within the M×M block. That is, for occupancy precision of M, any pixel in the occupancy map frame 522 that is valid and within an M×M block, then the entire block is marked as valid. This has the effect of marking some invalid pixels as valid when the M×M block is marked as valid.

It is noted that when the occupancy map frame 522 is decoded (by a decoder such as the decoder 550) the occupancy precision value M is also identified within the bitstream or derived from other syntax elements. The decoder (such as the decoder 550) restores the occupancy map frame to its original size, based on the value M. It is noted that as a result of changing an invalid pixel to a valid pixel, by the encoder 510, certain pixels that were previously invalid in the geometry and attribute frames 518 and 520 are now identified in the decoded occupancy map as valid. As such, when the point cloud is reconstructed and rendered superfluous points appear as artifacts which reduce the visual quality of the point cloud. To avoid artifacts in the rendered point cloud, an occupancy precision value of one can be used, such that only one pixel is within a 1×1 block and therefore the value of the pixel cannot change from an invalid pixel to a valid pixel. That is, when the occupancy precision value is set to one, the value of a pixel cannot change due to the presence of another pixel within the block since only one pixel is within a 1×1 block. However, to compress an occupancy map frame with occupancy precision of 1 losslessly requires a lot of bits and may not represent the best trade-off between bit-rate and visual quality of the reconstructed point cloud. In certain embodiments, it is often necessary to perform geometry and color smoothing at the decoder 550, for an occupancy precision that is larger than one. When the occupancy precision is one, the geometry and color smoothing at the decoder 550 can be omitted.

The scaling engine 524 modifies the occupancy map frames 522 such that the frames can be encoded (by an encoding engine 526) in a lossy manner with a small occupancy precision value. In certain embodiments, the scaling engine 524 reduces the number of bits needed to encode the occupancy map while maintaining an occupancy precision value such as one. It is noted that larger occupancy precision values can be used such as two, four, as well as and larger values, but as discussed above, larger occupancy precision values can create artifacts in the reconstructed point cloud.

Syntax (1) below describes an occupancy parameter set syntax. The syntax element "occupancy_codec_id" of Syntax (1) indicates the identifier of the codec that is used to compress the occupancy map information. It is noted that the "occupancy_codec_id" is in the range of 0 and 255, inclusive. The syntax element "lossy_occupancy_map_compression_threshold" of Syntax (1) indicates the threshold will be used by the decoder 550 to derive the binary occupancy map from the decoded occupancy map video. It is noted that "lossy_occupancy_map_compression_threshold" is also in the range of 0 to 255, inclusive.

```
Syntax                                                          (1)
occupancy_information_set( atlasId ) {
    oi_occupancy_codec_id[ atlasId ]
    oi_lossy_occupancy_map_compression_threshold[ atlasId ]
    oi_occupancy_nominal_2d_bitdepth_minus1[ atlasId ]
    oi_occupancy_MSB_align_flag[ atlasId ]
}
```

The scaling engine 524 modifies each of the occupancy map frames 522 by a scaling factor. Since the occupancy map frames 522, before scaling, include the values of one (indicating a valid pixel in the geometry and attribute frames 518 and 520) and zero (indicating an invalid pixel in the geometry and attribute frames 518 and 520), the pixels which correspond to valid pixels in the geometry and attribute frames 518 and 520 will have a value corresponding to the scale factor, while the pixels which correspond to invalid pixels in the geometry and attribute frames 518 and 520 will remain zero. That is, the scaling engine 524 multiples each value in the occupancy map by the scaling factor. In certain embodiments, the scaling factor is predetermined such as the value of 65.

In certain embodiments, the scaling factor is included in the bit stream and transmitted to another device such as the decoder 550. In other embodiments, the scaling engine identifies a scaling threshold, based on the scaling factor, and includes the scaling threshold in the bit stream that is transmitted to another device such as the decoder 550. The scaling engine 524 can set the scaling threshold to a value based on the scaling factor. For example, the scaling engine 524 can set the scaling threshold to a value that is greater than zero but less than the scaling factor. Alternatively, the scaling engine 524 can set the scaling threshold to a value that is half of the scaling factor. When the scaling factor is included in the bit stream, a fixed-length code can be used. In certain embodiments, the length of the code is eight. It is noted that other codes, such as exponential Golomb codes can be used. Similarly, an index from a predetermined set of scale factors known to both the encoder and decoder can be signals.

In some embodiments, the scaling factor is included in the bitstream 530. In some embodiments, the scaling threshold is included in the bitstream 530. Additionally, an enabling flag for lossy occupancy map compression can be included in the bitstream 530. Syntax (2) below describes the enabling flag for lossy occupancy map compression.

```
Syntax                                                          (2)
sequence_parameter_set( ) {
    profile_idc
    tier_flag
    level_idc
    frame_width
    frame_height
    additional_points_patch_enabled_flag
    if ( additional_points_patch_enabled_flag ) {
        additional_points_separate_video_enabled_flag
    }
    sps_lossy_occupancy_map_compression_enabled_flag
    if( sps_lossy_occupancy_compression_enabled_flag)
        sps_lossy_occupancy_map_compression_threshold
    enhanced_depth_code_enabled_flag
    ...
}
```

In syntax (2) above the elements "sps_lossy_occupancy_map_compression_enabled_flag" and "sps_lossy_occupancy_map_compression_threshold," can be used to describe lossy encoding to the occupancy map frames 522. For example, the syntax element "sps_lossy_occupancy_ map_compression_enabled_flag" indicates whether the occupancy map is compressed in a lossy or lossless manner. For example, if the "sps_lossy_occupancy_map_compression_enabled_flag" is equal to one, it indicates that the occupancy map is compressed in a lossy manner. Alternatively, if the "sps_lossy_occupancy_map_compression_enabled_flag" is equal to zero, it indicates that the occupancy map is coded losslessly. The syntax element "sps_lossy_occupancy_map_compression_threshold" indicates the scaling threshold that is to be used in the decoder 550 to derive the binary occupancy map from the decoded occupancy map video. When the syntax element "sps_lossy_occupancy_ map_compression_threshold" is not present, then it is inferred to be zero. It is noted that if sequence level or frame level lossless coding is enabled, then "sps_lossy_occupancy_map_compression_enabled_flag" is zero.

In certain embodiments, instead of signaling "sps_lossy_occupancy_map_compression_threshold," the element "sps_lossy_occupancy_map_compression_threshold_minus1" can by signaled. The element "sps_lossy_occupancy_map_compression_threshold_minus1" indicates that the threshold that is used to derive the binary occupancy map from the decoded occupancy map video. When this element is not present in the syntax (3), it is inferred to be −1. Syntax (3) below describes the syntax element of "sps_lossy_occupancy_map_compression_threshold_minus1." It is noted that when "sps_lossy_occupancy_map_compression_enabled_flag" is equal to one, then "sps_lossy_occupancy_map_compression_threshold_minus1" is greater than or equal to zero. It is noted that if sequence level or frame level lossless coding is enabled, then "sps_lossy_occupancy_map_compression_enabled_flag" is zero.

```
Syntax                                                    (3)
sequence_parameter_set( ) {
    profile_tier_level( )
    sps_sequence_parameter_set_id
    sps_frame_width
    sps_frame_height
    sps_avg_frame_rate_present_flag
    sps_lossy_occupancy_map_compression_enabled_flag
    if( sps_lossy_occupancy_compression_enabled_flag )
        sps_lossy_occupancy_map_compression_threshold_minus1
    sps_enhanced_occupancy_map_for_depth_flag
    sps_layer_count_minus1
    ...
}
```

The syntax elements "sps_lossy_occupancy_map_compression_enabled_flag" and either "sps_lossy_occupancy_map_compression_threshold" or "sps_lossy_occupancy_map_compression_threshold_minus1" can be sent at the frame level instead of the sequence level. If one of the aforementioned syntax elements is sent at the frame level, a lossy compression occupancy map can be signaled at the sequence level. Then, if necessary, at the frame level, a frame level lossy occupancy map compression enabling flag is signaled followed by the scaling threshold.

In certain embodiments, instead of sending an enabling flag (such as in Syntax (2) above) or the threshold minus one flag (such as in Syntax (3) above) a threshold can be sent directly. Syntax (4) below describes using the syntax element "sps_lossy_occupancy_map_compression_threshold." It is noted, that the syntax element "sps_lossy_occupancy_map_compression_threshold." indicates the threshold that is used to derive the binary occupancy map from the decoded occupancy map video. When this syntax element is not present in the syntax (4), it is inferred to be zero. Additionally, the syntax element "sps_lossy_occupancy_ map_compression_threshold is in the range of 0 to 255, inclusive. It is noted that if sequence level or frame level lossless coding is enabled, then "sps_lossy_occupancy_map_compression_threshold" is zero.

```
Syntax                                                    (4)
sequence_parameter_set( ) {
    profile_tier_level( )
    sps_sequence_parameter_set_id
    sps_frame_width
    sps_frame_height
    sps_avg_frame_rate_present_flag
    sps_lossy_occupancy_map_compression_threshold
    sps_enhanced_occupancy_map_for_depth_flag
    sps_layer_count_minus1
    ...
}
```

In certain embodiments, the scaling threshold can be signaled at the frame level but its signaling is dependent on an enabling flag at the sequence level. Syntax (5) below describes a sequence parameter and the Syntax (6) describes the frame patch header. Syntax (5) and (6) below describe the syntax element "sps_lossy_occupancy_map_compression_enabled_flag." It is noted, that when the syntax element "sps_lossy_occupancy_map_compression_enabled_flag" is equal to one, the occupancy map may be compressed in a lossy manner. Alternatively, when the syntax element "sps_lossy_occupancy_map_compression_enabled_flag" is equal to zero, the occupancy map may be coded losslessly. The syntax element "pfh_lossy_occupancy_map_compression_threshold" indicates the scaling threshold that is used by the decoder to derive the binary occupancy map from the decoded occupancy map video at the frame level. When the syntax element "When the syntax element "sps_lossy_occupancy_map_compression_threshold" is not present, then it is inferred to be zero. It is noted that instead of signaling a threshold using a fixed number of bits, an exponential Golomb, Golomb Rice, or the like can be used. It is also noted that the syntax element names as used herein are for examples only as the exact name for the syntax elements described both above and below can change as well as refer to different levels of the bitstream. For example, the syntax element indicating the occupancy map threshold, such as lossy_occupancy_map_compression_threshold can correspond to a sequence level.

```
Syntax                                                    (5)
sequence_parameter_set( ) {
    profile_tier_level( )
    sps_sequence_parameter_set_id
    sps_frame_width
    sps_frame_height
    sps_avg_frame_rate_present_flag
    sps_lossy_occupancy_map_compression_enabled_flag
    sps_enhanced_occupancy_map_for_depth_flag
    sps_layer_count_minus1
    ...
}
```

```
Syntax                                                    (6)
patch_frame_header( frmIdx ) {
    pfh_patch_frame_parameter_set_id[ frmIdx ]
    pfh_address[ frmIdx ]
    pfh_type[ frmIdx ]
    if( sps_lossy_occupancy_map_compression_enabled_flag)
        pfh_lossy_occupancy_map_compression_threshold
    pfh_patch_frame_order_cnt_lsb[ frmIdx ]
    ...
}
```

Strong edges in the occupancy map frames 522 can be formed when the scaling engine 524 modifies the occupancy map frames 522 by the scaling factor. Block based codecs such as HEVC generally perform poorly when hard edges are included in a frame which can cause an increase in the bitrate and introduce artifacts into the reconstructed occupancy map. As such, the scaling engine 524 can apply a pre-filter to the modified occupancy map frames before the encoding engine 526 encodes and compresses the modified occupancy map frames, in order to reduce hard edges. In certain embodiments, a low pass pre filter can be used to smooth the modified occupancy map frames. FIGS. 6B, 6C, and 6D, discussed below, illustrate example pre-filters that can be applied to the modified occupancy map frames before the frames are encoded by the encoding engine 526.

In certain embodiments, the coefficients of the pre-filter are normalized, such that the overall energy of the input signal and the filtered signal are equal. For example, the filter coefficients can sum up to a power of two, such as 256. After the scaling engine 524 performs the filtering, where the coefficients of the pre-filter add up to 256, the resultant cumulative sum is right shifted by eight (which is equivalent to dividing by 256) to equalize the energy of the input signal and filtered signal.

Certain isolated pixels that correspond to valid pixels (non-zero values) in the modified occupancy map frames can be set to a value of zero. For example, the scaling engine 524 inspects the modified occupancy map frames and identifies the pixels that correspond to non-zero values which are fully surrounded by invalid pixels. The scaling engine 524 changes the value of each isolated pixel that corresponds to a non-zero value, to an invalid pixel, by changing the non-zero value of the pixel to a value of zero. Similarly, certain isolated pixels that correspond to invalid pixels in the modified occupancy map frames can be set to a non-zero value. For example, the scaling engine 524 inspects the modified occupancy map frames and identifies the pixels that correspond to a value of zero which are fully surrounded by valid pixels. The scaling engine 524 changes the value of each isolated pixel that corresponds to invalid pixel, to non-zero value, by changing the invalid pixel to a non-zero value. FIGS. 6E and 6F discussed below, illustrate examples of isolated pixels. It is noted that modifying the isolated pixels can be performed in the encoder 510, the decoder 550, or both encoder 510 and the decoder 550. In the decoder 550 the modifying of the isolated pixels can be performed after the thresholding operation to convert the decoded occupancy map video to a binary occupancy map.

In certain embodiments, the occupancy map frames 522 may include more than two values. That is, if the occupancy map frames 522 include multiple values, then multiple scale factors can be used. For example, if the occupancy map frame 522 includes the values of 0, 1, and 2, then two scale factors can be used. The first scale factor, denoted as "scale_factor_1," can be less than the second scale factor, denoted as "scale_factor_2." The scaling engine 524 can multiply each value of two in the occupancy map frame 522 by the scale_factor_2 and multiply each value of one in the occupancy map frame 522 by the scale_factor_1. Any value of zero in the occupancy map frame 522 remains zero. It is noted that there is one less scale factor than values in the occupancy map frames 522. The number of thresholds that are generated and transmitted to the decoder 550 are the same as the number of scale factors used to generate the modified occupancy map frames. For example, when the scaling engine 524 uses two scaling factors to generate the modified occupancy map frames, two scaling thresholds can be transmitted in the bitstream 530, such as "threshold_1" and "threshold_2."

The encoding engines 526 encode the geometry frames 518, the attribute frames 520, and the occupancy map frames 522. In certain embodiments, a single encoding engine 526 encodes the frames (such as the geometry frames 518, the attribute frames 520, and the occupancy map frames 522). In other embodiments, the frames (such as the geometry frames 518, the attribute frames 520, and the occupancy map frames 522) are encoded by independent encoding engines 526. For example, one encoding engine 526 can encode the geometry frames 518, another encoding engine 526 can encode the attribute frames 520, and yet another encoding engine 526 can encode the occupancy map frames 522. In certain embodiments, the encoding engines 526 can be configured to support an 8-bit, a 10-bit, a 12-bit, a 14-bit, or a 16-bit, precision of data. The encoding engine 526 can be a video or image codec such as HEVC, AVC, VP9, VP8, JVNET, and the like to compress the 2D frames representing the 3D point cloud.

The geometry, attribute, and occupancy map frames 518, 520 and 522 can be encoded in a lossless manner or a lossy manner. It is noted that geometry, attribute, and occupancy map frames 518, 520 and 522 need not all be encoded in the same manner. For example, since the scaling engine 524 modifies the occupancy map frames 522, the encoding engine 526 can encode the occupancy map frames 522 in a lossy manner in order to reduce the number of bits needed to code the occupancy map frames 522.

In certain embodiments, the encoding engine 526 encodes the occupancy map frames 522 (as modified by the scaling engine 524) in a lossy manner using a high quantization parameter (QP) value to generate a compressed occupancy map. The QP value determines the quantization step size. Lower QP value results in higher video quality. The QP value is based on the scaling factor, the overall target rate for the compressed point cloud, or both. In certain embodiments, the QP value is 44.

In certain embodiments, if the encoding engines 526 encode the modified occupancy map frames 522 in a lossy manner and the occupancy map precision of one is used, then the encoder 510 generates a flag that instructs the decoder 550 to disable color and geometry smoothing. In certain embodiments, if the encoding engines 526 encode the modified occupancy map frames 522 in a lossy manner and the occupancy map precision of two or four is used, then a the encoder 510 generates a flag that instructs the decoder 550 to perform 2D filtering on the decodes occupancy map data for improving the visual quality of the reconstructed point cloud.

The multiplexer 528 combines the multiple frames (such as the geometry frames 518, the attribute frames 520, and the modified occupancy map frames 522) which are encoded, to create a bitstream 530.

FIG. 5C illustrates the decoder 550 that includes a demultiplexer 552, one or more decoding engines 560, and a scaling engine 562, and a reconstruction engine 564. The decoder 550 receives a bitstream 530, such as the bitstream that was generated by the encoder 510. The demultiplexer 552 separates bitstream 530 into one or more bitstreams representing the different frames. For example, the demultiplexer 552 separates various streams of data such as the geometry frame information 554 (corresponding to the encoded geometry frames 518 of FIG. 5B), attribute frame information 556 (corresponding to the encoded attribute frames 520 of FIG. 5B), and the occupancy map information 558 (corresponding to the occupancy map frames 522 of FIG. 5B that are modified by the scaling engine 524).

The decoding engines 560 decode the geometry frame information 554 to generate the geometry frames. The decoding engines 560 decode the attribute frame information 556 to generate the attribute frames. Similarly, the decoding engines 560 decode the occupancy map information 558 to generate the occupancy map frames (that could be modified by the scaling engine 524). In certain embodiments, a single decoding engine 560 decodes the geometry frame information 554, the attribute frame information 556, and the occupancy map information 558.

In certain embodiments, the video decoding process is invoked using the occupancy video bitstream and its associated codec specified by ops_occupancy_codec_id (as shown in Syntax (1), above). The outputs of the decoding process can include at least one the following: a variable oPrecision, the frame rate of the occupancy map video, OccFrameRate, the decoded and display/output ordered occupancy video frames, OccFrame[orderOdx][compIdx][y][x], and their associated bitdepth, OccBitdepth[orderIdx], width, OccWidth[orderIdx], and height, OccHeight [orderIdx]. It is noted that orderIdx is the display order index of the decoded occupancy map frames and compIdx corresponds to the color component index and is equal to 0. Similarly y is in the range of 0 to OccHeight [orderIdx]−1, inclusive, and x is the column index in the decoded frame and is in the range of 0 to OccWidth[orderIdx]−1, inclusive.

The scaling engine 562 identifies the scaling factor or the scaling threshold from the bitstream. For example, after the decoding engine 560 decodes the occupancy map information 558 to generate the occupancy map frames, the scaling engine 562 identifies the scaling factor or the scaling threshold. The scaling engine 562 modifies the decoded occupancy map frames by returning decoded occupancy map frames to a binary state of zeros and ones. For example, scaling engine 562 compares each value within the decoded occupancy map to the scaling threshold. When a value of a pixel in the occupancy map frame is less than or equal to the scaling threshold, it indicates an invalid pixel and the scaling engine 562 sets that value of that pixel to zero. Alternatively, if the value of a pixel of a pixel in the occupancy map frame is greater than the scaling threshold, it indicates a valid pixel and the scaling engine 562 sets the value of that pixel to one.

The value of the scaling threshold is based on the scale factor that was used in the scaling engine 524 of the encoder 510. In certain embodiments, the encoder 510 transmits the scaling threshold, such that the scaling engine 562 simply compares the values of the decoded occupancy map frames to the scaling threshold. In other embodiments, the encoder 510 transmits the scaling factor, and the scaling engine 562 identifies a scaling threshold based on the received scaling factor. If the scaling factor is received (instead of the scaling threshold), the scaling engine 562 sets the scaling threshold to half of the scaling factor. Alternatively, the scaling engine 562 can set the scaling threshold to a value that is greater than zero but less than the scaling factor.

The decoder 550 can identify the occupancy precision value. If the occupancy precision is set to a value that is greater than one, the scaling engine 562 returns the binary occupancy map to its full resolution based on the received occupancy precision value.

If Syntax (2), described above, is transmitted in the bitstream the values of the decoded occupancy map are compared to the element "sps_lossy_occupancy_map_compression_threshold." For example, if the value of a pixel in the decoded occupancy map is less than or equal to "sps_lossy_occupancy_map_compression_threshold," then that value is set to zero, otherwise that occupancy map value is set to one. If the occupancy precision value is greater than one, the occupancy map is up sampled after the decoded occupancy map is modified (by comparing the values to the syntax element "sps_lossy_occupancy_map_compression_threshold").

If Syntax (3), described above, is transmitted in the bitstream the values of the decoded occupancy map are compared to the element "sps_lossy_occupancy_map_compression_threshold_minus1" plus one. For example, if the value of a pixel in the decoded occupancy map is less than or equal to "sps_lossy_occupancy_map_compression_threshold_minus1" plus one, then that value is set to zero, otherwise that occupancy map value is set to one. If the occupancy precision value is greater than one, the occupancy map is up sampled after the decoded occupancy map is modified (by comparing the values to the syntax element "sps_lossy_occupancy_map_compression_threshold_minus1").

If Syntax (4), described above, is transmitted in the bitstream the values of the decoded occupancy map are compared to the element "sps_lossy_occupancy_map_compression_threshold." For example, if the value of a pixel in the decoded occupancy map is less than or equal to "sps_lossy_occupancy_map_compression_threshold" then that value is set to zero, otherwise that occupancy map value is set to one. If the occupancy precision value is greater than one, the occupancy map is up sampled after the decoded occupancy map is modified (by comparing the values to the syntax element "sps_lossy_occupancy_map_compression_threshold"). It is noted that the decoding process is the same regardless of whether the occupancy map frames 522 are compressed lossy or losslessly.

In certain embodiments, if the syntax element "sps_enhanced_occupancy_map_for_depth_flag" of Syntax (4) is equal to zero, then each decoded occupancy map with a display order index of orderIdx, compIdx that is zero is modified by deriving the scaling threshold. Syntax (7) below describes the process of deriving the scaling threshold. For example, if the bitdepth of occupancy map frame 522 is 8 bits, the threshold is used as is. Alternatively, the threshold is left shifted by (occupancy map bitdepth−8), as indicated by the expression, lossyOccMapThreshold[orderIdx]=ops_lossy_occupancy_map_compression_threshold<<(OccBitdepth[orderIdx]−8).

Syntax (7)
```
lossyOccMapThreshold[ orderIdx
]=ops_lossy_occupancy_map_compression_thr
eshold << ( OccBitdepth[ orderIdx ] − 8 ).
    for( y=0; y < OccHeight[ orderIdx ]; y++ )
        for( x=0; x < OccWidth[ orderIdx ]; x++ )
            if( OccFrame[ orderIdx ][ compIdx ][ y ][ x
            ]<=lossyOccMap
Threshold[orderIdx ] )
                OccFrame[ orderIdx ][ compIdx ][ y ][ x ] = 0
            else
                OccFrame[ orderIdx ][ compIdx ][ y ][ x ] = 1
```

Certain isolated pixels that correspond to valid pixels (non-zero values) in the occupancy map frames can be set to a value of zero. For example, after converting the decoded occupancy map to binary, the scaling engine 562 inspects the occupancy map frames and identifies the pixels that correspond to valid pixels (pixels with value of one) which are surrounded by invalid pixels (pixels with a value of zero). The scaling engine 562 changes the value of each isolated valid pixel to an invalid pixel by changing the occupancy map value from one to zero. Similarly, certain isolated pixels that correspond to invalid pixels in the occupancy map frames (pixels with a value of zero) can be set to a value of one. For example, the scaling engine 562 inspects the binary occupancy map frames and identifies the isolated pixels that correspond to a value of zero which are surrounded by valid pixels (pixels with a value of one). The scaling engine 562 changes the value of each isolated invalid to a valid pixel, by changing the occupancy map value from zero to one. FIGS. 6E and 6F discussed below, illustrate examples of isolated pixels.

In certain embodiments, the encoder 510 can generate an occupancy map frame with more than two values. When the encoder 510 can generate an occupancy map frame with more than two values, multiple thresholds are received in the bitstream 530. For example, the scaling engine 562 can identify two scaling thresholds in the bitstream 530, such as a first threshold, "threshold_1" and a second threshold "threshold_2." It is noted that "threshold_1" is less than the second threshold "threshold_2." The scaling engine 562 changes the value of a pixel in the decoded occupancy map frame to zero when the pixels value is less than or equal to the first threshold, "threshold_1." The scaling engine 562 changes the value of a pixel in the decoded occupancy map frame to one, when the pixels value is less than or equal to the second threshold, "threshold_2." The scaling engine 562 changes the value of a pixel in the decoded occupancy map frame to two, when the pixels value is greater than the second threshold, "threshold_2." It is noted that this can be extended to m occupancy maps values in the original occupancy map frames (occupancy map frame 522 of FIG. 5B) by using m−1 scale factors and m−1 thresholds.

In certain embodiments the decoder 550 determines whether the decoded occupancy map frames are a similar size as the signaled frame width and height (asps_frame_width and asps_frame_height). If the decoded occupancy map frames are smaller than the signaled frame width and height, the decoder 550 up-samples the decoded occupancy map frames to match the signaled frame width and height.

After the geometry frame information 554, the attribute frame information 556, and the occupancy map information 558 are decoded, and the occupancy map frames are returned to a binary state, the reconstruction engine 564 generates a reconstructed point cloud 566 by using the decoded geometry frame information 554, the decoded attribute frame information 556, and the binary occupancy map frames. The reconstructed point cloud 566 is similar to the 3D point cloud 512.

Although FIGS. 5A-5C illustrate one example of a transmitting a point cloud various changes may be made to FIGS. 5A-5C. For example, additional components can be included in the encoder 510 and the decoder 550. For another example, additional information such as the patch width, the patch height, patch position on the 2D frames, 3D offsets and the like can be included in the bitstream.

Figure 6A:
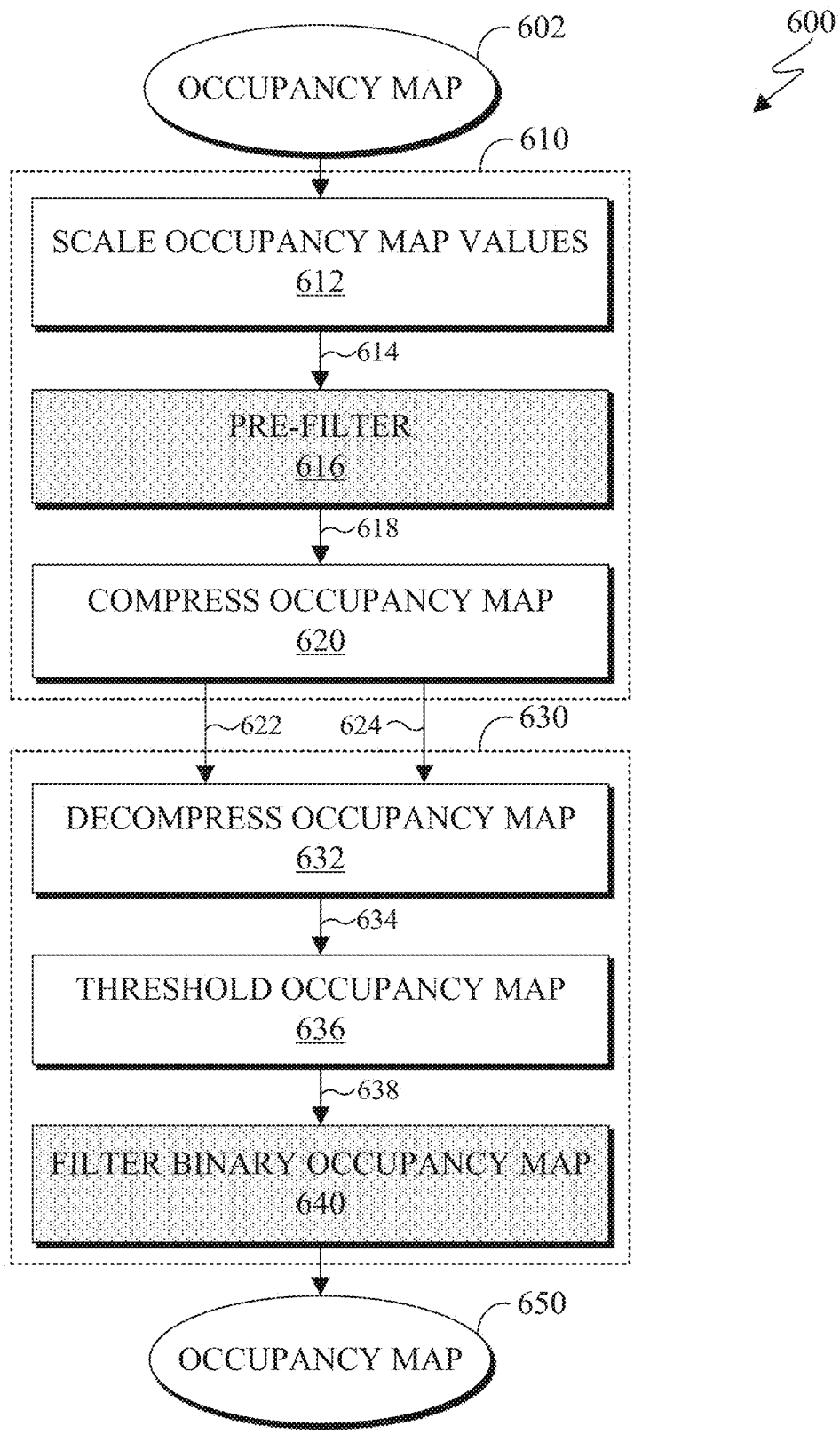
FIG. 6A illustrates an example process for modifying a binary occupancy map for lossy encoding and returning the modified occupancy map to original binary state in accordance with an embodiment of this disclosure.
Figure 6E:
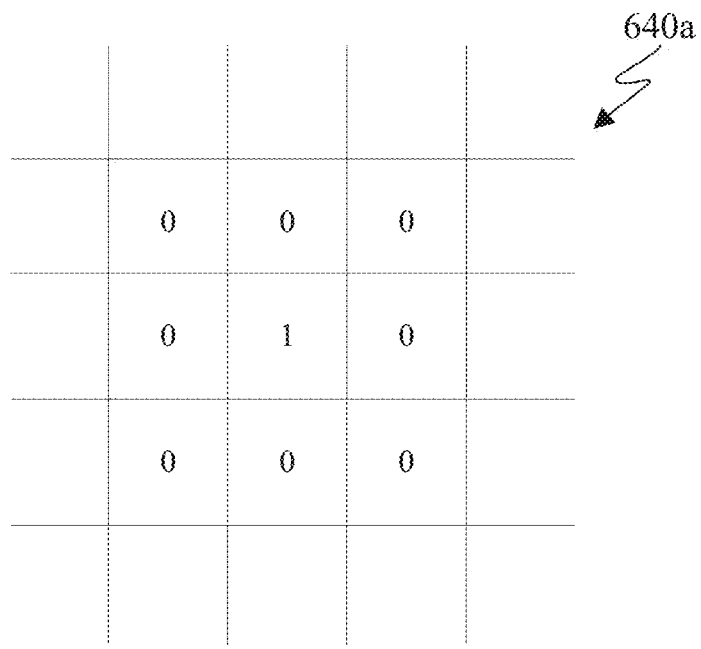
FIGS. 6E and 6F illustrates example diagrams of isolated pixels in the occupancy map frame in accordance with an embodiment of this disclosure.
Figure 6F:
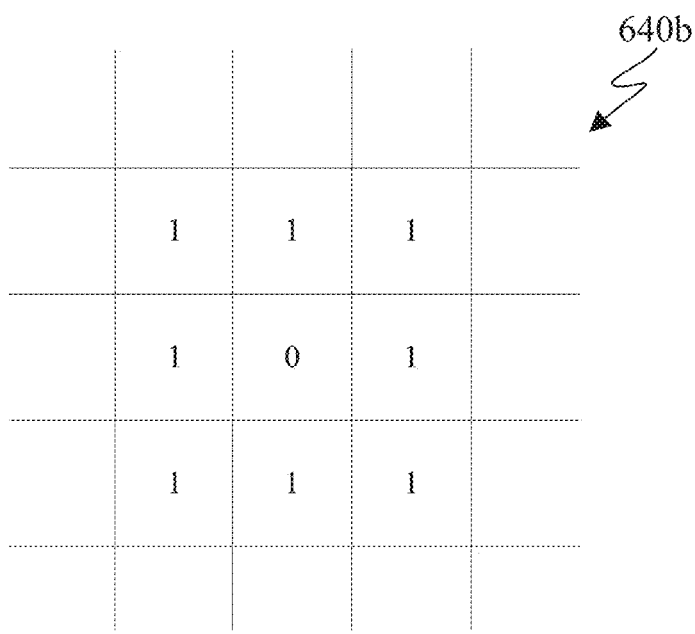

FIG. 6A illustrates an example process 600 for modifying a binary occupancy map for lossy encoding and returning the modified occupancy map to binary occupancy map in accordance with an embodiment of this disclosure. FIGS. 6B, 6C, and 6D illustrate example pre-filters 616a, 616b, and 616c in accordance with an embodiment of this disclosure. FIGS. 6E and 6F illustrates example diagrams 640a and 640b illustrating isolated pixels in the occupancy map frame in accordance with an embodiment of this disclosure.

The process 600 includes both an encoding process 610 and the decoding process 630 with respect to the occupancy map frames, such as the occupancy map frames 522 of FIG. 5B. The encoding process 610 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. The decoding process 630 can be performed by the server 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the process 600 is described as being performed by the decoder 550 of FIGS. 5A and 5C.

The encoding process 610 receives an occupancy map 602. The occupancy map 602 can be generated by the frame packing 516 of FIG. 5B. In certain embodiments, the occupancy map 602 includes a value at each pixel which indicates whether the pixel is valid or invalid. For example, a value of the occupancy map can be zero, indicating invalid pixels at the same position in the geometry and attribute frames 518 and 522 or one, indicating a valid pixel at the same position in the geometry and attribute frames 518 and 522.

In step 612, the scaling engine 524 scales the occupancy map values. For example, the scaling engine 524 multiplies each value in the occupancy map by a scale factor to generate the modified occupancy map 614.

In step 616, the scaling engine 524 applies a pre-filter to the modified occupancy map 614. The pre-filter removes any hard edges at patch boundaries in order to reduce the bitrate. Applying the pre-filter generates the smoothed occupancy map 618. The pre-filters 616a, 616b and 616c, of FIGS. 6B, 6C, and 6D, respectively, illustrate example pre filters. The pre-filters 616a, 616b and 616c can act as a sliding filter that pass over and smooths the values the modified occupancy map 614.

In step 620, the encoding engines 526 compress the smoothed occupancy map 618 in a lossy manner to generate the compressed occupancy map 622. The encoding process 610 transmit both the compressed occupancy map 622 and a scaling threshold 624 to the decoding process 630.

In certain embodiments, the step 616 is omitted from the encoding process 610. If the pre-filter is omitted from the process 600, in step 620, the encoding process receives the modified occupancy map 614 instead of the smoothed occupancy map 618.

In certain embodiments, the encoding process 610 can also change the values of isolated pixels. For example, the scaling engine 524 inspects the modified occupancy map 614 and identifies every pixel that is completely surrounded by pixels of a different value. For example, if the value of an identified isolated pixel is one (and the value of all of the bordering pixels are zero), then the scaling engine 524 changes the value of that pixel from one to zero. Similarly, if the value an identified isolated pixel is zero (and the value of all of the bordering pixels are one), then the scaling engine 524 changes the value of that pixel from zero to one. Generally, a single pixel has eight neighboring pixels, (three above, three below, and one on each side of the pixel). In certain embodiments, the scaling engine 524 identifies a pixel as an isolated pixel when all eight neighboring pixels are the opposite value. In other embodiments, the scaling engine 524 identifies a pixel as an isolated pixel when the neighboring pixels of the neighboring pixels also have the opposite value. There are twenty-four neighboring pixels of the neighboring pixels in this case.

In step 632, the decoding engines 560 decode the received compressed occupancy map 622 to generate the decoded occupancy map 634. The decoded occupancy map 634 may include more than two values due to compressing and decompressing the occupancy map in a lossy manner.

In step 636, the scaling engine 562 applies the scaling threshold 624 to the decoded occupancy map 634 to generate the binary occupancy map 638. Each value in the decoded occupancy map 634 is compared to the scaling threshold 624. When a value in the decoded occupancy map 634 is greater than the scaling threshold 624 then that value is replaced with a first value. When a value in the decoded occupancy map 634 is less than or equal to the scaling threshold 624 then that value is replaced with a second value. The first value can represent a valid pixel while the second value can represent an invalid pixel. For example, the first value can be one and the second value can be zero.

In step 640, the scaling engine 562 inspects the binary occupancy map 638 and identifies every pixel that is completely surrounded by pixels of a different value. For example, if the value of an identified isolated pixel is one (and the value of all of the bordering pixels are zero), then the scaling engine 562 changes the value of that pixel from one to zero. Similarly, if the value an identified isolated pixel is zero (and the value of all of the bordering pixels are one), then the scaling engine 562 changes the value of that pixel from zero to one. In certain embodiments, the scaling engine 524 identifies a pixel as an isolated pixel when all eight neighboring pixels are the opposite value. In other embodiments, the scaling engine 524 identifies a pixel as an isolated pixel when the neighboring pixels of the neighboring pixels (24 pixels) also have the opposite value. FIG. 6E illustrates the diagram 640*a* of an isolated valid pixel while FIG. 6F illustrates the diagram 640*b* of an isolated invalid pixel. The scaling engine 562 can change the value of the valid pixel in the diagram 640*a* to an invalid pixel. Similarly, the scaling engine 562 can change the value of the invalid pixel in the diagram 640*b* to a valid pixel.

After the scaling engine 562 changes the values of the pixels that are completely surrounded by pixels of a different value, the occupancy map 650 of FIG. 6A is generated. The occupancy map 650 indicates the valid pixels in the geometry frames and the attribute frames that are used to reconstruct the 3D point cloud. In certain embodiments, the step 640 is omitted from the decoding process 630. If the step 640 is omitted from the process 600, the binary occupancy map 638 is the occupancy map 650.

Although FIGS. 6A-6F illustrate one example of a transmitting a point cloud various changes may be made to FIGS. 6A-6F. For example, while shown as a series of steps, various steps in FIG. 6A could overlap, occur in parallel, occur any number of times, or be omitted. For another example, various other pre-filters can be used to smooth the modified occupancy map 614.

Figure 7:
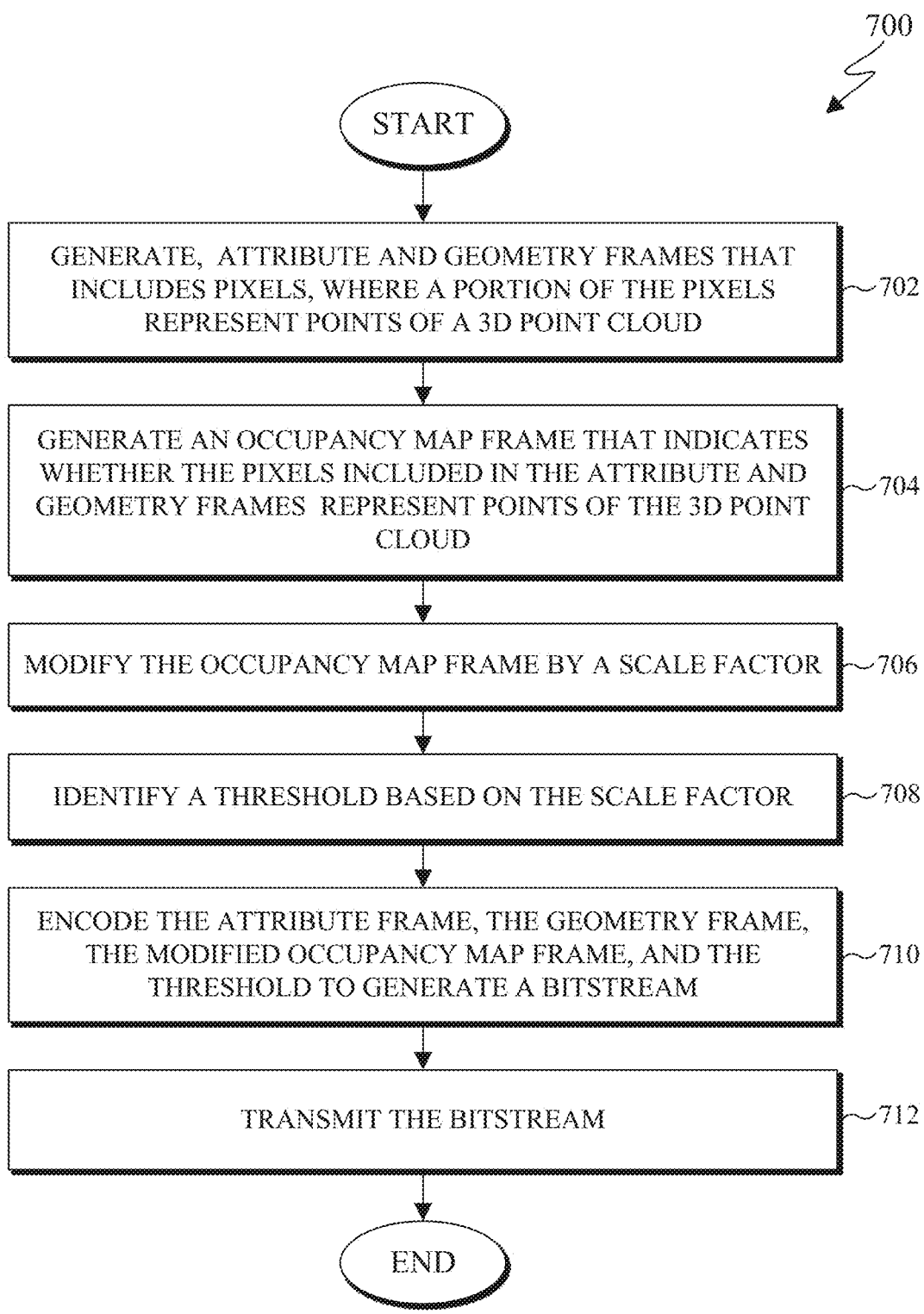
FIG. 7 illustrates example method for encoding a point cloud in accordance with an embodiment of this disclosure.

FIG. 7 illustrates example method 700 for encoding a point cloud in accordance with an embodiment of this disclosure. The method 700 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the method 700 is described as being performed by the encoder 510 of FIGS. 5A and 5B.

In step 702, the encoder 510 generates a geometry frame, representing the geometric position of points of the 3D point cloud. The encoder 510 can also generate one or more attribute frames representing various attributes of the 3D point cloud, such as color. The geometry frame and the attribute frame include patches that represent clusters of points in the 3D point cloud. A portion of the pixels included in the attribute and geometry frames represent points of the 3D point cloud.

In step 704, the encoder 510 generates an occupancy map frame. The occupancy map frame indicates whether the pixels included in the attribute and geometry frames, at respective positions in the occupancy map frame, represent the points of the 3D point cloud. In certain embodiments, a value of a pixel in the occupancy map frame is a first value (to indicate a valid pixel in the attribute and geometry frames) or a second value (to indicate an invalid pixel in the attribute and geometry frames).

After the occupancy map frame is generated, the encoder 510 can set a particular occupancy precision value. The occupancy precision value that is greater than one reduces the overall resolution of the occupancy map. For example, if the occupancy precision value of 4 is selected by the encoder 510, each 4×4 block of pixels in the occupancy map is inspected and reduced to a single pixel. If any pixel in the 4×4 block of pixels is a value that represents a valid pixel in the geometry frame and the attribute frame, then the single pixel is a value that represents a valid pixel. Alternatively, if all of the pixels in the 4×4 block of pixels represent invalid pixels in the geometry frame and the attribute frame, then the single pixel is a value that represents an invalid pixel.

In step 706, in order to encode the occupancy map frame in a lossy manner, the encoder 510 modifies the occupancy map frame by a scale factor. In certain embodiments, the encoder 510 identifies a scale factor. In other embodiments, the scale factor is predetermined. For example, the encoder 510 multiples each value in the occupancy map frame by the scale factor. If the values in the occupancy map are zero and one, the modified occupancy map will include the values of zero and the scale factor.

In step 708, the encoder 510 identifies a scaling threshold. In certain embodiments, the scaling threshold is based on the scaling factor. For example, the scaling threshold can be set to a value that is half of the scaling factor. For another example, the scaling threshold can be set to a value that is between zero and half of the scaling factor. For instance, the scaling threshold can be set to a value that is greater than zero and less than half of the scale factor. In certain embodiments, the scaling threshold is a predetermined value.

In certain embodiments, the encoder 510 applies a low-pass pre-filter to the modified occupancy map. The low-pass pre-filter smooths hard edges that are generated by modifying the occupancy map. The coefficients of the low-pass pre-filter can be normalized and when added together correspond to a value that enables a bit-shift operation. Additionally, in certain embodiments, the encoder changes the value of any isolated pixel. For example, if the value of an isolated pixel is one (corresponding to a valid pixel), the encoder 510 changes the value to zero (corresponding to an invalid pixel). Similarly, if the value of an isolated pixel is zero (corresponding to an invalid pixel), the encoder 510 changes the value to one (corresponding to a valid pixel).

In step 710, the encoder 510 encodes the geometry frame, the attribute frame, and the modified occupancy map frame. In certain embodiments, the geometry frame, the attribute frame, and the modified occupancy map frame, or a combination thereof can be encoded in a lossy manner. After the frames representing geometry, the frames representing one or more attributes, and the frames representing the occupancy map are encoded, the encoder 510 can multiplex the frames into a bitstream. In step 712, the encoder 510 transmits the compressed bitstream. The compressed bitstream can be ultimately transmitted to a decoder, such as the decoder 550.

Although FIG. 7 illustrates one example of a point cloud encoding various changes may be made to FIG. 7. For example, while shown as a series of steps, various steps in FIG. 7 could overlap, occur in parallel, or occur any number of times.

Figure 8:
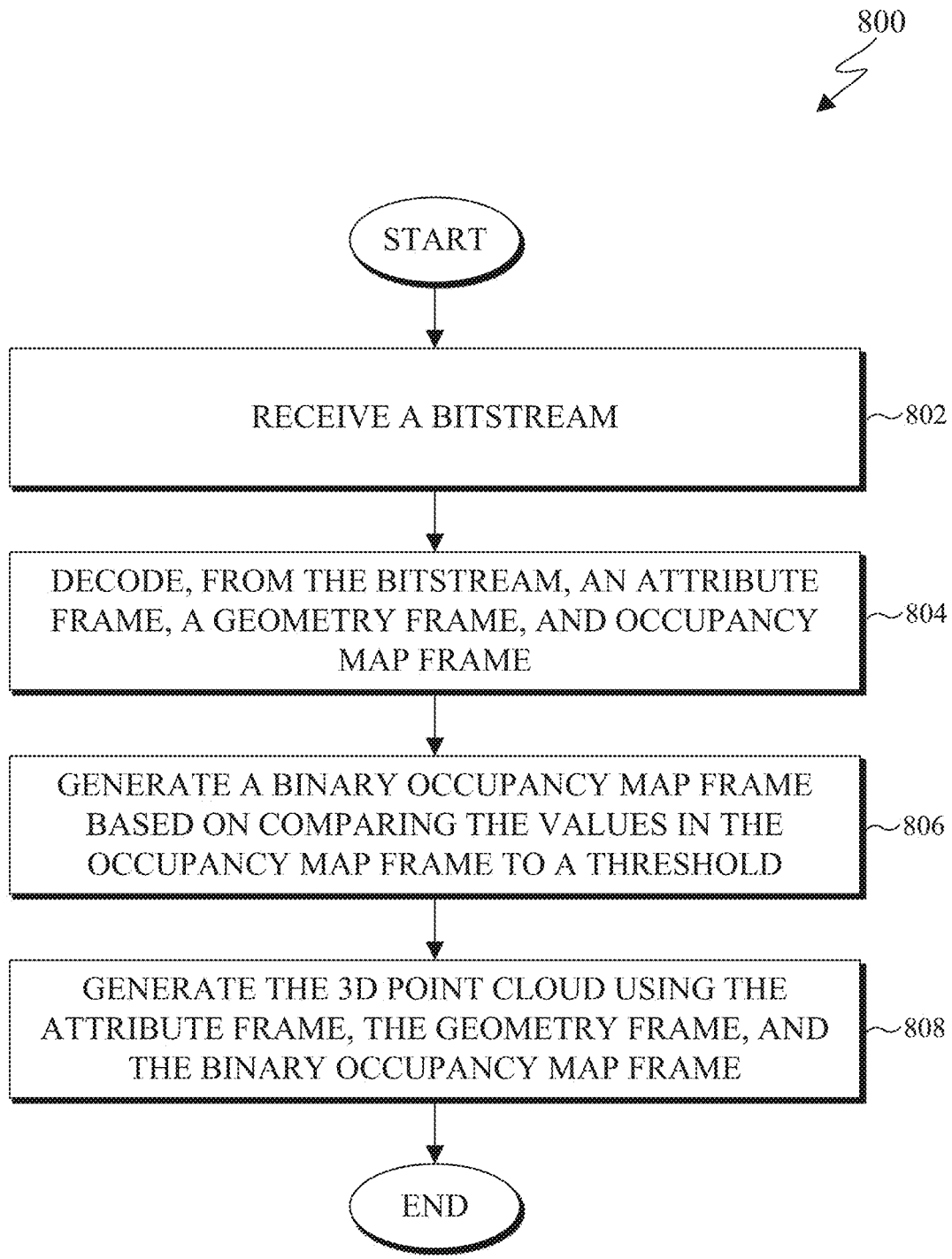
FIG. 8 illustrates example method for decoding a point cloud in accordance with an embodiment of this disclosure.

FIG. 8 illustrates example method 800 for decoding a point cloud in accordance with an embodiment of this disclosure. The method 800 can be performed by the server 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the method 800 is described as being performed by the decoder 550 of FIGS. 5A and 5C.

The method 800 begins with the decoder, such as decoder 550, receiving a bitstream (step 802). The received bitstream can include an encoded point cloud that was mapped onto multiple 2D frames, compressed, and then transmitted and ultimately received by the decoder 550. In certain embodiments, a scaling threshold is included in the bitstream.

In step 804, the decoder 550 decodes the bitstream into multiple frames that represent a 3D point cloud. For example, a first frame can represent geometry information of the points of the point cloud, a second frame represents attribute information (such as color) of the points of the point cloud, and a third frame represents an occupancy map. In certain embodiments, additional frames that represent other attributes can be decoded. The geometry and attribute frames include pixels that are organized into patches that represent respective clusters of points from the 3D point cloud. The occupancy map identifies the pixels in the geometry and attribute frames that are valid as well as the pixels that are invalid. There is a correspondence (or a mapping) between the pixels in a frame that includes geometry information and each additional attribute frame (including the color frame).

In step 806 the decoder 550 modifies the decoded occupancy map frame, by changing the values of the pixels. The decoder 550 compares the value of each pixel to a scaling threshold to determine whether the pixels included in the attribute and geometry frames at corresponding positions in the occupancy map frame are valid pixels. If the value of the pixel in the occupancy map frame is greater than the threshold, then that pixel is changed to a first value. Alternatively, if the value of the pixel in the occupancy map frame is less than or equal to the threshold, then that pixel is changed to a second value. The first value represents an invalid pixel in the attribute and geometry frames, and the second value represents a valid pixel in the attribute and geometry frames. In certain embodiments, the first value is a zero and the second value is a one.

After the values in the occupancy map frame are changed, the decoder 550 can identify any isolated pixels. An isolated pixel can represent a valid pixel that is fully surrounded by invalid pixels or an invalid pixel that is fully surrounded by valid pixels. The decoder 550 can change the value of each identified isolated pixel. For example, if a valid pixel is fully surrounded by invalid pixels, the decoder 550 changes the valid pixel to an invalid pixel. Similarly, if an invalid pixel is fully surrounded by valid pixels, the decoder 550 changes the invalid pixel to a valid pixel. In certain embodiments, a pixel (that represents a valid pixel in the geometry and attribute frame) can be identified as isolated when each neighboring pixel corresponds to a pixel an invalid pixel (or vis-versa). In certain embodiments, a pixel (that represents a valid pixel in the geometry and attribute frame) can be identified as isolated when multiple predefined levels of neighboring pixels indicate correspond to an invalid pixel (or vis-versa).

In step 808, the decoder 550 generates the 3D point cloud. For example, the decoder 550 generates the 3D point cloud based on the geometry frame, the attribute frame, and the modified occupancy map frame.

Although FIG. 8 illustrates one example of a point cloud decoding various changes may be made to FIG. 8. For example, while shown as a series of steps, various steps in FIG. 8 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Although the present disclosure has been described with an exemplary embodiment, various changes and modifications may be suggested to one skilled in the art.

It is intended that the present disclosure encompass such changes and modifications as fall within the scope of the appended claims.

What is claimed is:

1. A decoding device for point cloud decoding, the decoding device comprising:
   a communication interface configured to receive a bitstream; and
   a processor operably coupled to the communication interface, wherein the processor is configured to:
      decode, from the bitstream, an attribute frame, a geometry frame, and occupancy map frame, wherein the attribute and geometry frames include pixels representing points of a 3D point cloud and the occupancy map frame includes values,
      generate a binary occupancy map frame based on comparing the values in the occupancy map frame to a scaling threshold to determine whether the pixels included in the attribute and geometry frames at corresponding positions in the binary occupancy map frame are valid pixels, and
      generate the 3D point cloud using the attribute frame, the geometry frame, and the binary occupancy map frame.

2. The decoding device of claim 1, wherein to generate the binary occupancy map frame, the processor is configured to:
   identify the scaling threshold from the bitstream;
   compare each value in the occupancy map frame to the scaling threshold;
   when the value in the occupancy map frame is greater than the scaling threshold, set the value to a first value; and
   when the value in the occupancy map frame is less than or equal to the scaling threshold, set the value to a second value.

3. The decoding device of claim 2, wherein:
   the first value indicates a valid pixel in the attribute and geometry frames; and
   the second value indicates an invalid pixel in the attribute and geometry frames.

4. The decoding device of claim 1, wherein the processor is further configured to change an invalid pixel in the binary occupancy map frame to a valid pixel, when neighboring pixels of the invalid pixel are valid pixels.

5. The decoding device of claim 1, wherein the processor is further configured to apply a filter to the binary occupancy map frame to change an isolated valid pixel in the binary occupancy map frame to an invalid pixel.

6. The decoding device of claim 5, wherein to apply the filter, the processor is configured to:
   identify a first valid pixel included in the binary occupancy map frame;
   determine that no neighboring pixels of the first valid pixel is valid; and
   when no neighboring pixels of the first valid pixel are valid, change the first valid pixel to an invalid pixel.

7. An encoding device for point cloud encoding, the encoding device comprising:
   a processor configured to:
      generate, for a three-dimensional (3D) point cloud, an attribute frame that includes pixels and a geometry frame that includes pixels, wherein a portion of the pixels included in the attribute and geometry frames represent points of the 3D point cloud,
      generate an occupancy map frame that indicates whether the pixels included in the attribute and geometry frames, at respective positions in the occupancy map frame, represent the points of the 3D point cloud, modify the occupancy map frame by a scale factor, identify a scaling threshold based on the scale factor, and encode the attribute frame, the geometry frame, the modified occupancy map frame, and the scaling threshold to generate a bitstream; and a communication interface operably coupled to the processor, the communication interface configured to transmit the bitstream.

8. The encoding device of claim 7, wherein to modify the occupancy map frame, the processor further configured to apply a low-pass pre-filter.

9. The encoding device of claim 8, wherein to apply the low-pass pre-filter, the processor is configured to:

identify a first pixel included in the modified occupancy map frame; and generate a value for the first pixel by applying the low-pass pre-filter to the first pixel and neighboring pixels of the first pixel.

10. The encoding device of claim 8, wherein the low-pass pre-filter includes a set of coefficients that are normalized and when added together correspond to a value that enables a bit-shift operation.

11. The encoding device of claim 7, wherein to identify the scaling threshold the processor is configured to set the scaling threshold to a value that is half of the scale factor.

12. The encoding device of claim 7, wherein to identify the scaling threshold the processor is configured to set the scaling threshold to a value that is greater than zero and less than half of the scale factor.

13. The encoding device of claim 7, wherein the modified occupancy map frame is encoded in a lossy manner.

14. The encoding device of claim 7, wherein to generate the occupancy map frame, the processor is configured to set an occupancy precision value to one.

15. A method for point cloud decoding comprising:

receiving a bitstream;

decoding, from the bitstream, an attribute frame, a geometry frame, and occupancy map frame, wherein the attribute and geometry frames include pixels representing points of a 3D point cloud and the occupancy map frame includes values;

generating a binary occupancy map frame based on comparing the values in the occupancy map frame to a scaling threshold to determine whether the pixels included in the attribute and geometry frames at corresponding positions in the binary occupancy map frame are valid pixels; and generating the 3D point cloud using the attribute frame, the geometry frame, and the binary occupancy map frame.

16. The method of claim 15, wherein generating the binary occupancy map frame comprises:

identifying the scaling threshold from the bitstream;

comparing each value in the occupancy map frame to the scaling threshold;

when the value in the occupancy map frame is greater than the scaling threshold, setting the value to a first value; and when the value in the occupancy map frame is less than or equal to the scaling threshold, setting the value to a second value.

17. The method of claim 16, wherein:

the first value indicates a valid pixel in the attribute and geometry frames; and the second value indicates an invalid pixel in the attribute and geometry frames.

18. The method of claim 15, further comprising changing an invalid pixel in the binary occupancy map frame to a valid pixel, when neighboring pixels of the invalid pixel are valid pixels.

19. The method of claim 15, further comprising applying a filter to the binary occupancy map frame to change an isolated valid pixel in the binary occupancy map frame to an invalid pixel.

20. The method of claim 19, wherein applying the filter comprises:

identifying a first valid pixel included in the binary occupancy map frame;

determining that no neighboring pixels of the first valid pixel is valid; and when no neighboring pixels of the first valid pixel are valid, changing the first valid pixel to an invalid pixel.

* * * * *